United States Patent [19]
Yagasaki et al.

[11] Patent Number: 5,574,504
[45] Date of Patent: Nov. 12, 1996

[54] METHODS AND SYSTEMS FOR ENCODING AND DECODING PICTURE SIGNALS AND RELATED PICTURE-SIGNAL RECORDING MEDIA

[75] Inventors: Yoichi Yagasaki; Jun Yonemitsu, both of Kanagawa, Japan

[73] Assignee: Sony Corporation, Tokyo, Japan

[21] Appl. No.: 517,992

[22] Filed: Aug. 22, 1995

Related U.S. Application Data

[63] Continuation of Ser. No. 79,592, Jun. 22, 1993, abandoned.

[30] Foreign Application Priority Data

Jun. 26, 1992 [JP] Japan .................................... 4-169430
Apr. 13, 1993 [JP] Japan .................................... 5-085038

[51] Int. Cl.⁶ .............................. H04N 7/32; H04N 7/30
[52] U.S. Cl. .................. 348/415; 348/416; 348/412; 348/413
[58] Field of Search .................................... 348/415, 403, 348/409, 412, 416, 413, 699; H04N 7/32, 7/30

[56] References Cited

U.S. PATENT DOCUMENTS

| | | | |
|---|---|---|---|
| 4,985,768 | 1/1991 | Sugiyama | 348/402 |
| 5,089,888 | 2/1992 | Zdepski et al. | 348/405 |
| 5,093,720 | 3/1992 | Krause et al. | 348/699 |
| 5,150,432 | 9/1992 | Ueno et al. | 348/438 |
| 5,175,618 | 12/1992 | Ueda et al. | 348/416 |
| 5,185,819 | 2/1993 | Ng et al. | 348/409 |
| 5,227,878 | 7/1993 | Puri et al. | 348/699 |
| 5,237,410 | 8/1993 | Inoue | 348/409 |
| 5,293,229 | 3/1994 | Iu | 348/415 |
| 5,317,397 | 5/1994 | Odaka et al. | 348/699 |
| 5,424,779 | 7/1995 | Odaka et al. | 348/416 |

*Primary Examiner*—Howard W. Britton
*Assistant Examiner*—Vu Le
*Attorney, Agent, or Firm*—William S. Frommer; Alvin Sinderbrand

[57] ABSTRACT

Picture-signal encoding methods and systems are disclosed for encoding interlaced scan picture signals. A first one of a pair of interlaced odd and even fields of one frame, as well as a field of another frame are encoded. The second one of the pair of interlaced odd and even fields is encoded such that at least a portion is encoded through bidirectional prediction from three fields. Decoding methods and systems are disclosed for decoding the picture-signal encoded as described above. Record media storing the encoded signals are also disclosed.

34 Claims, 22 Drawing Sheets

ENCODER BLOCK DIAGRAM

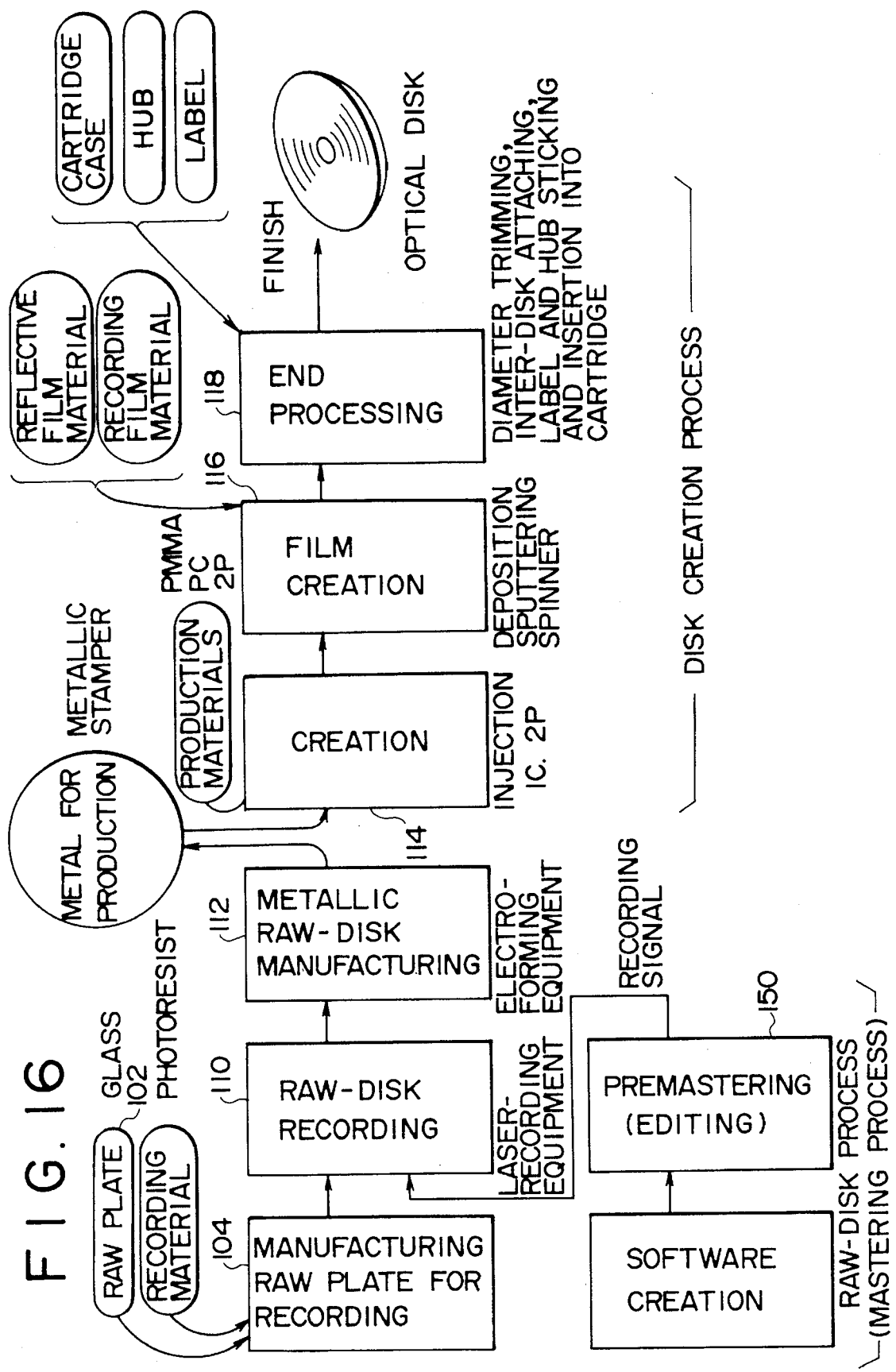

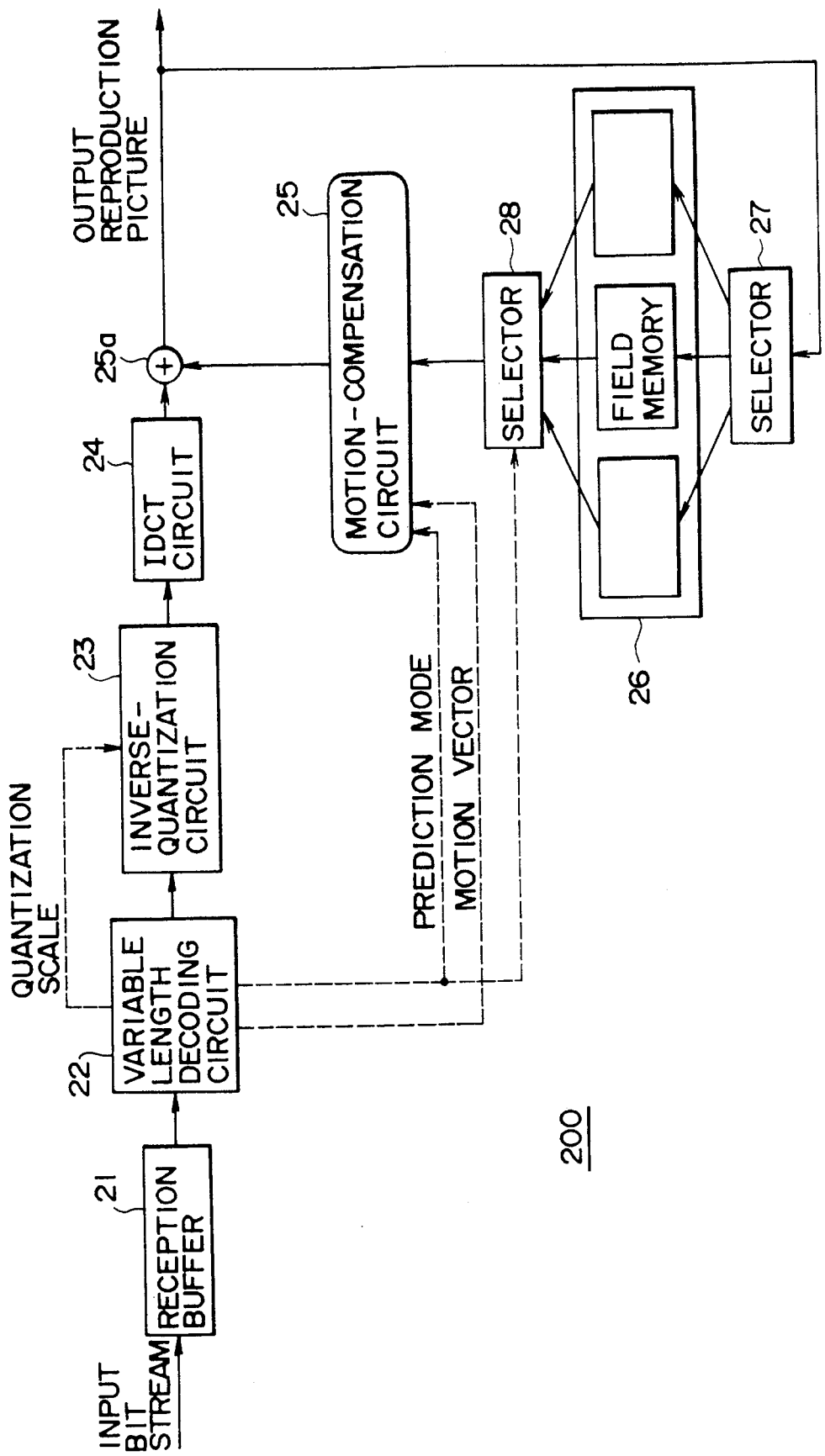

METHODS AND SYSTEMS FOR ENCODING AND DECODING PICTURE SIGNALS AND RELATED PICTURE-SIGNAL RECORDING MEDIA

This application is a continuation of application Ser. No. 08/079,592, filed Jun. 22, 1993 now abandoned.

BACKGROUND OF THE INVENTION

The present invention relates to efficient techniques for encoding and decoding a picture signal and a recording medium which are suitable for information recording/reproduction apparatus employing motion-video picture recording media such as optical disks and magnetic tapes as well as information transmission/reception apparatus typically used in so-called television conference systems, video telephone systems, broadcasting equipment and the like.

In a picture-signal transmission system such as a television conference system or a video telephone system in which a picture signal conveying picture information is transmitted to a remote location, the picture signal is encoded based on line correlation and interpicture correlation of the picture signal in order to improve the utilization efficiency of the transmission lines. By transmitting only non-redundant information, transmission efficiency can be improved.

With reference to FIG. 1, an example of a picture signal encoding technique is there provided wherein pictures PC1, PC2, PC3 and so on, at times t=t1, t2, t3 and so on, which together constitute motion video picture information, are encoded for transmission.

Prior to transmission, the picture data is compressed through orthogonal conversion processing such as DCT processing in an itraframe encoding process which utilizes the line correlation of the picture signal. In addition, interframe encoding can be employed as shown in the figure.

In the interframe encoding processing, by utilizing interpicture correlation of the picture signal, differences in pixel data between adjacent pictures PC1 and PC2, PC2 and PC3 and so on, indicated as PC12 and PC23 in FIG. 1, are found one after another so that a better compression rate can be achieved.

In comparison to transmission of all of the picture data comprising the pictures PC1, PC2, PC3 and so on, the picture-signal transmission system of FIG. 1 transmits a very small amount of data through a transmission medium after undergoing a digital high-performance encoding process. Examples of intraframe and interframe encoding techniques are provided in U.S. Pat. Nos. 5,155,593, 5,132,792, 4,985,768 and 4,982,285.

FIG. 2 is a diagram showing an encoding process for a sequence of pictures using intraframe and interframe encoding. As shown in FIG. 2, fifteen frames constitute an encoding unit called a group of pictures (GOP).

In this example, it is assumed that frame 2 undergoes intraframe encoding, a process which employs picture data only from the frame being encoded. Such a frame is called an Intra coded picture, meaning an intrapicture-coded frame, and is also referred to simply as an I picture.

In the illustrated encoding method, frames 5, 8, 11 and 14 are either intraframe encoded or are predicted in only the forward direction, thereby undergoing interframe encoding. Such frames are a kind of predictive coded pictures which are sometimes referred to simply as P pictures. The frames are encoded in macroblock units, each macroblock unit or "macroblock" including the data of a section of a respective frame. Depending on context, the term "macroblock" can refer to data in various forms, such as pixel data and coded representations of pixel data for example. In actuality, either the forward-prediction encoding process or the intraframe encoding process, whichever provides better efficiency, is selected for each P picture macroblock. In forward-prediction encoding of a given macroblock of a frame currently being encoded, differences are found between the macroblock and a predicted picture which is produced through motion-compensation using a timewise-preceding picture as a base. In forward-prediction encoding, the predicted picture is used as a reference to find such differences. Here, the timewise-preceding picture is a picture that has already been encoded and subsequently decoded. In contrast, intraframe encoding is carried out without finding such differences.

Let frames 0, 1, 3, 4, 6, 7, 9, 10, 12 and 13 be frames that can be encoded by intraframe encoding as well as through prediction from either or both directions, forward and backward, thereby undergoing interframe encoding. Such frames are a kind of bidirectionally-predictive coded pictures and are also referred to simply as B pictures. In practice, either bidirectional-prediction encoding or intraframe encoding, encoding as is without finding differences, whichever provides better efficiency, is selected for each macroblock. When bidirectional-prediction encoding is selected, differences are found for each macroblock from a predicted picture which is produced through motion-compensation using a timewise-preceding picture, a timewise-succeeding picture or both as a base.

In this example, the order in which the frames are input, their encoding order, decoding order and the order in which they are output or displayed are shown in FIG. 3 as 40, 42, 44 and 46, respectively.

The encoding technique described above is designed with progressive scan (non-interlaced) moving pictures in mind. In order to encode interlaced scan pictures by means of this technique it is first necessary to convert the pictures to a frame format, which requires the use of a frame memory. In addition, a frame memory is required by the decoder to recover the interlaced scan pictures from the decoded frame-format pictures.

However, when interlaced scan pictures are encoded frame-by-frame in this fashion, the result is poor prediction efficiency. For example, if an accelerating object is present in the moving pictures, the ability to closely predict the data of one frame from an adjacent frame using motion compensation is impaired. Substantial differences thus result between the data of the frame being encoded and that of the motion compensated, predicted frame, so that the amount of data which must be transmitted remains disadvantageously high.

In addition, since it is necessary to limit the amount of encoded data to avoid exceeding the transmission capacity, the data is requantized with a selectable quantization value. When the amount of encoded data increases such that the capacity of a transmission buffer memory of the encoder would be exceeded, consequently, the system automatically adjusts the quantization value to reduce the amount of data produced by encoding in order to compensate. When the encoding technique described above is used to encode interlaced scan pictures, the substantially large amount of data resulting from encoding leads to a substantial decrease in picture quality.

SUMMARY OF THE INVENTION

It is an object of the present invention to provide methods, systems and device-readable records which alleviate the problems and disadvantages described above.

It is another object of the present invention to provide methods and systems for implementing prediction encoding and decoding techniques suitable for an interlaced scan data structure.

It is a further object of the present invention to provide encoding and decoding methods, systems and device-readable records which are suitable for random-access.

It is still another object of the present invention to provide encoding methods and systems which are readily adaptable to carry out encoding and decoding in field and frame units.

In accordance with an aspect with of the present invention, a picture-signal encoding method for encoding interlaced scan picture signals including a plurality of frames, each frame including a pair of interlaced odd and even fields, comprises the steps of: encoding a first one of a pair of interlaced odd and even fields of one of said plurality of frames; encoding a field of another one of said plurality of frames; and encoding the second one of said pair of interlaced odd and even fields such that at least a portion of said second one of said pair of interlaced odd and even fields is encoded predictively from at least a portion of one of said first one of said pair of interlaced odd and even fields and said field of said another one of said plurality of frames.

In accordance with another aspect of the present invention, a picture-signal decoding method for decoding interlaced scan picture signals including a plurality of frames, each frame including a pair of interlaced odd and even fields, the interlaced scan signals including a first one of a pair of interlaced odd and even fields of one of said plurality of frames, a field of another one of said plurality of frames, and a second one of said pair of interlaced odd and even fields in which a portion thereof is encoded predictively from at least a portion of one of said first one of said pair of interlaced odd and even fields and said field of said another one of said plurality of frames, comprises the steps of: decoding the first one of said pair of interlaced odd and even fields of said one of said plurality of frames; decoding the field of said another one of said plurality of frames; and decoding the second one of said pair of interlaced odd and even fields, including decoding said portion thereof predictively by forming a prediction thereof based on said portion of said one of said first one of said pair of interlaced odd and even fields and said field of said another one of said plurality of frames.

In accordance with a further aspect of the present invention, a picture-signal encoding system for encoding interlaced scan picture signals including a plurality of frames, each frame including a pair of interlaced odd and even fields, comprises: means for encoding a first one of a pair of interlaced odd and even fields of one of said plurality of frames; means for encoding a field of another one of said plurality of frames; and means for encoding the second one of said pair of interlaced odd and even fields such that at least a portion of said second one of said pair of interlaced odd and even fields is encoded predictively from at least a portion of one of said first one of said pair of interlaced odd and even fields and said field of said another one of said plurality of frames.

In accordance with still another aspect of the present invention, a picture-signal decoding system for decoding interlaced scan picture signals including a plurality of frames, each frame including a pair of interlaced odd and even fields, the interlaced scan signals including a first one of a pair of interlaced odd and even fields of one of said plurality of frames, a field of another one of said plurality of frames, and a second one of said pair of interlaced odd and even fields in which a portion thereof is encoded predictively from at least a portion of one of said first one of said pair of interlaced odd and even fields and said field of said another one of said plurality of frames, comprises: means for decoding the first one of said pair of interlaced odd and even fields of said one of said plurality of frames; means for decoding the field of said another one of said plurality of frames; and means for decoding the second one of said pair of interlaced odd and even fields, including decoding said portion thereof predictively by forming a prediction thereof based on said portion of said one of said first one of said pair of interlaced odd and even fields and said field of said another one of said plurality of frames.

In accordance with a still further aspect of the present invention, a device-readable record storing interlaced scan picture signals including a plurality of frames, each frame including a pair of interlaced odd and even fields, comprises: a record medium; a first one of a pair of interlaced odd and even fields of one of said plurality of frames stored on said record medium in encoded form; a field of another one of said plurality of frames stored on said record medium in encoded from; and a second one of said pair of interlaced odd and even fields stored on said record medium in encoded form, the second one of said pair of interlaced odd and even fields being encoded such that at least a portion thereof is encoded predictively from at least a portion of one of said first one of said pair of interlaced odd and even fields and said field of said another one of said plurality of frames.

In accordance with yet still another aspect of the present invention, a system for encoding interlaced scan picture signals including a plurality of frames, each frame including a pair of interlaced odd and even fields, comprises: encoding means having an input for receiving picture signals for encoding said picture signals in compressed form; local decoding means for decoding the compressed, encoded picture signals to provide decoded picture signals; field memory means for storing a field of the decoded picture signals; means for receiving a current field of the interlaced odd and even fields to be encoded; means for forming a predicted picture signal representing at least a portion of the current field based on the field stored in said field memory means; and subtracting means for subtracting said predicted picture signal from said at least a portion of the current field to form a prediction error picture signal; said encoding means being operative to encode said prediction error picture signal.

In accordance with a yet still further aspect of the present invention, a system for decoding compressed, encoded interlaced scan picture signals including a plurality of frames, each frame including a pair of interlaced odd and even fields, at least some of the fields including portions encoded predictively, comprises: means for decoding the compressed, encoded picture signals to produce decoded picture signals; encoding mode detection means for detecting predictively encoded portions of the encoded picture signals to produce a detection signal; adding means for adding a predicted signal to the decoded picture signals to produce output picture signals; field memory means for storing a field of said output picture signals; and means for producing said predicted signal based on the stored field of said output picture signals in response to said detection signal.

The above, and other objects, feature and advantages of the invention, will be apparent in the following detailed description of an illustrative embodiment thereof which is to be read in connection with the accompanying drawings forming a part hereof, and wherein corresponding parts and components are identified by the same reference numerals in the several views of the drawings.

BRIEF DESCRIPTION OF THE DRAWINGS

FIG. 16 is an explanatory diagram used for describing a technique for manufacturing a recording medium in accordance with an aspect of the present invention;

FIG. 18 is a block diagram of a decoder in accordance with the second, third and fourth embodiments.

DETAILED DESCRIPTION OF CERTAIN ADVANTAGEOUS EMBODIMENTS

The present invention will become more apparent from the following detailed description of certain advantageous embodiments when read with reference to the accompanying diagrams.

First Embodiment

Figure 1:
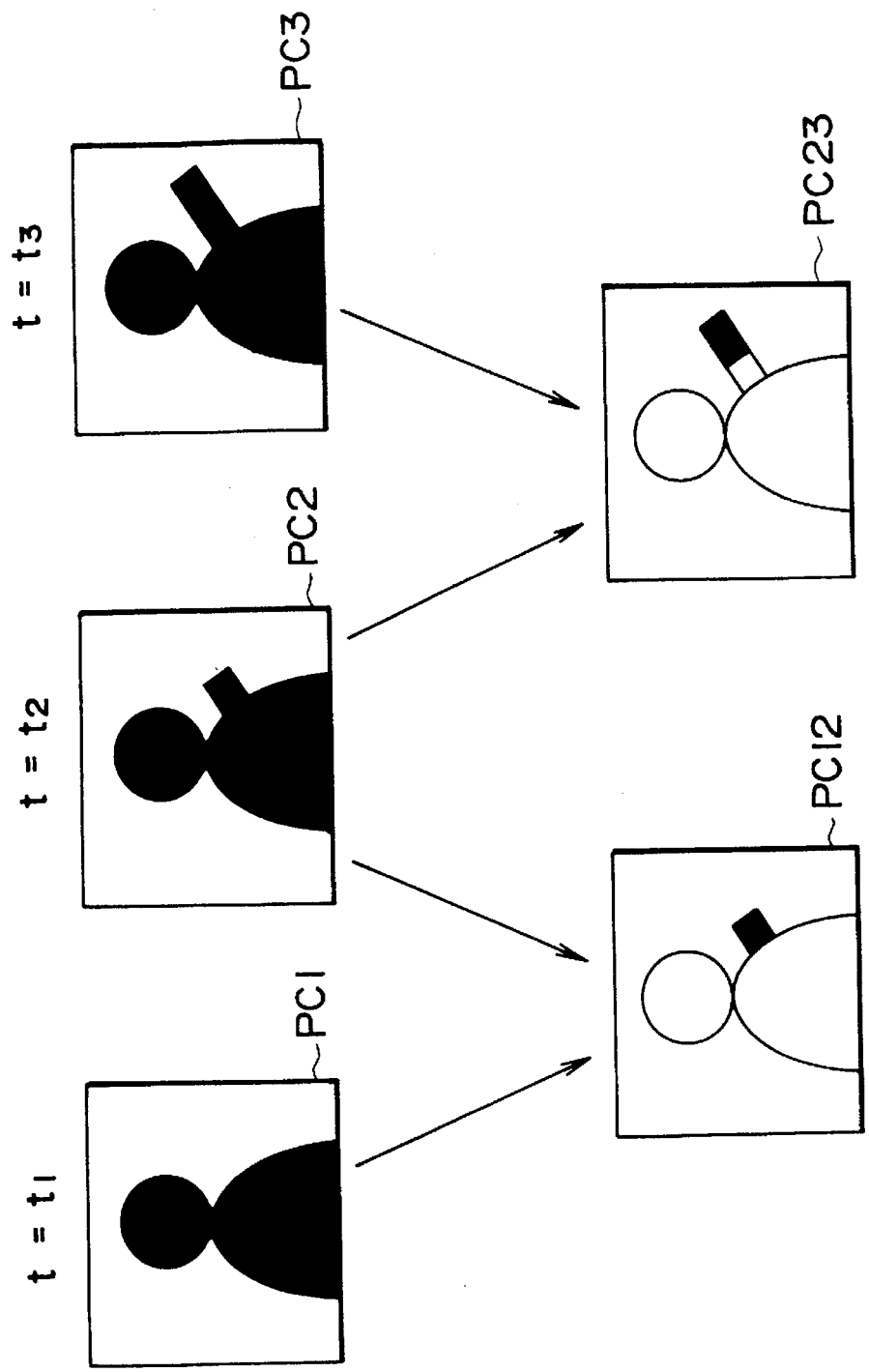
FIG. 1 is an explanatory diagram used for describing an interframe encoding technique for a progressive scan picture signal.
Figure 2:
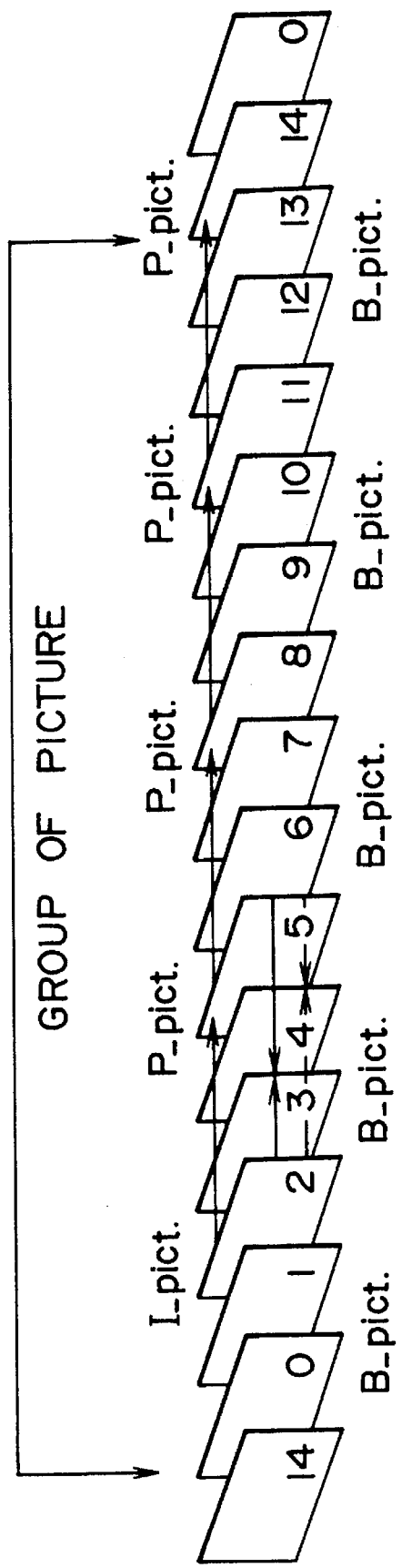
FIG. 2 is an explanatory diagram used for describing an encoding sequence for a group of pictures (GOP) of a progressive scan picture signal.
Figure 3:
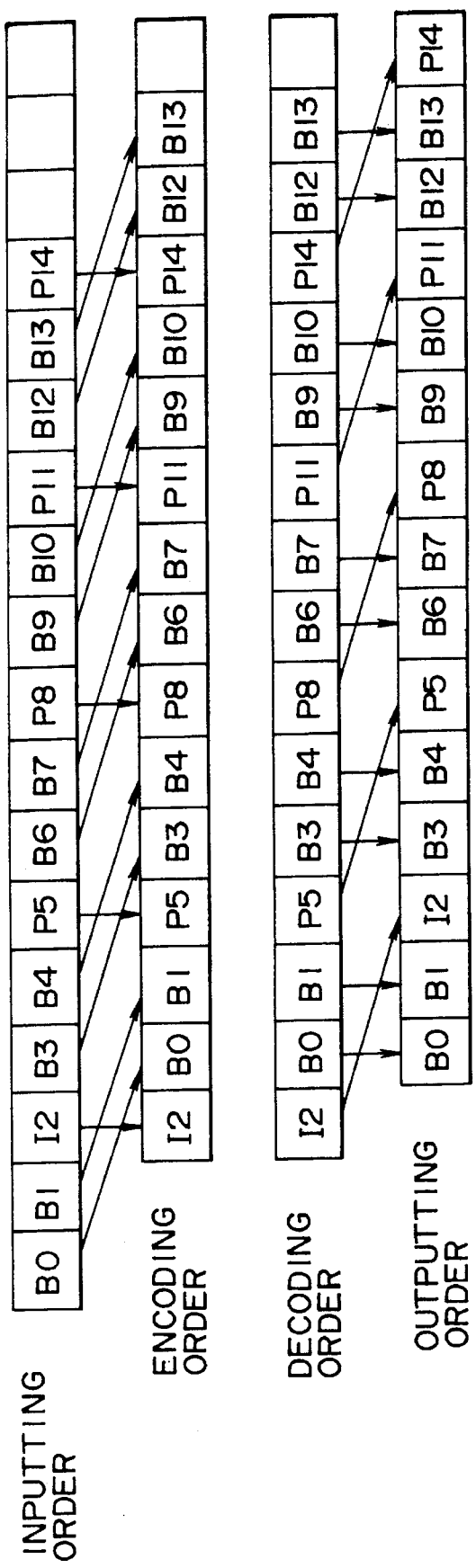
FIG. 3 is an explanatory diagram used for describing input, encoding, decoding and output picture sequences for a progressive scan picture signal.
Figure 4:
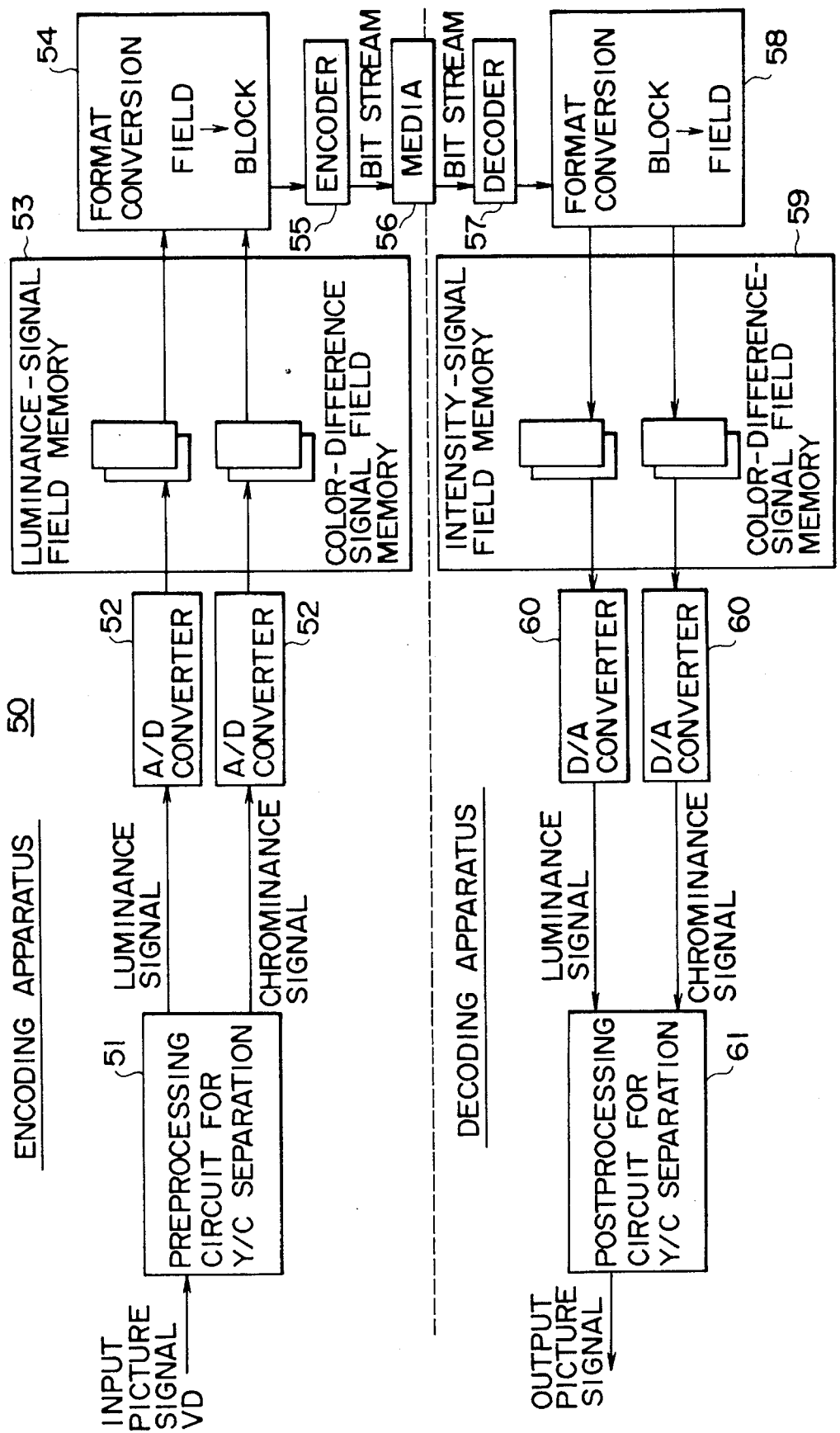
FIG. 4 is a block diagram of a system for encoding and decoding a motion video picture in accordance with an embodiment of the present invention.

An overall configuration of a system for encoding picture signals on a field-by-field basis and for decoding the encoded data is illustrated in FIG. 4. As shown therein, a motion video picture encoding apparatus 50 converts an input picture signal VD by means of a preprocessing circuit 51 into a luminance signal and a chrominance signal which are then converted into 8-bit digital data by an A/D (analog-to-digital) converter 52 before being stored in a field memory unit 53. Digital luminance data and digital chrominance data read out from the field memory unit 53 are supplied to a format converter 54. In the format converter 54, picture data to be transmitted sequentially as input picture data to an encoder 55 is converted into a block format.

The picture data in block format is supplied to the encoder 55 for carrying out high-performance compression encoding in order to generate a bit stream.

The bit stream is transmitted to a decoder 57 through a transmission medium such as a communication line or recording medium 56. Receiving the bit stream, the decoder 57 outputs block-formatted data to a format converter 58. The format converter 58 then converts the block-formatted data into field-formatted data. The field-formatted data resulting from the conversion is stored temporarily in a field memory unit 59 before being supplied to a postprocessing circuit 61 through a D/A (digital-to-analog) converter 60 to be finally produced as output pictures.

Figure 5:
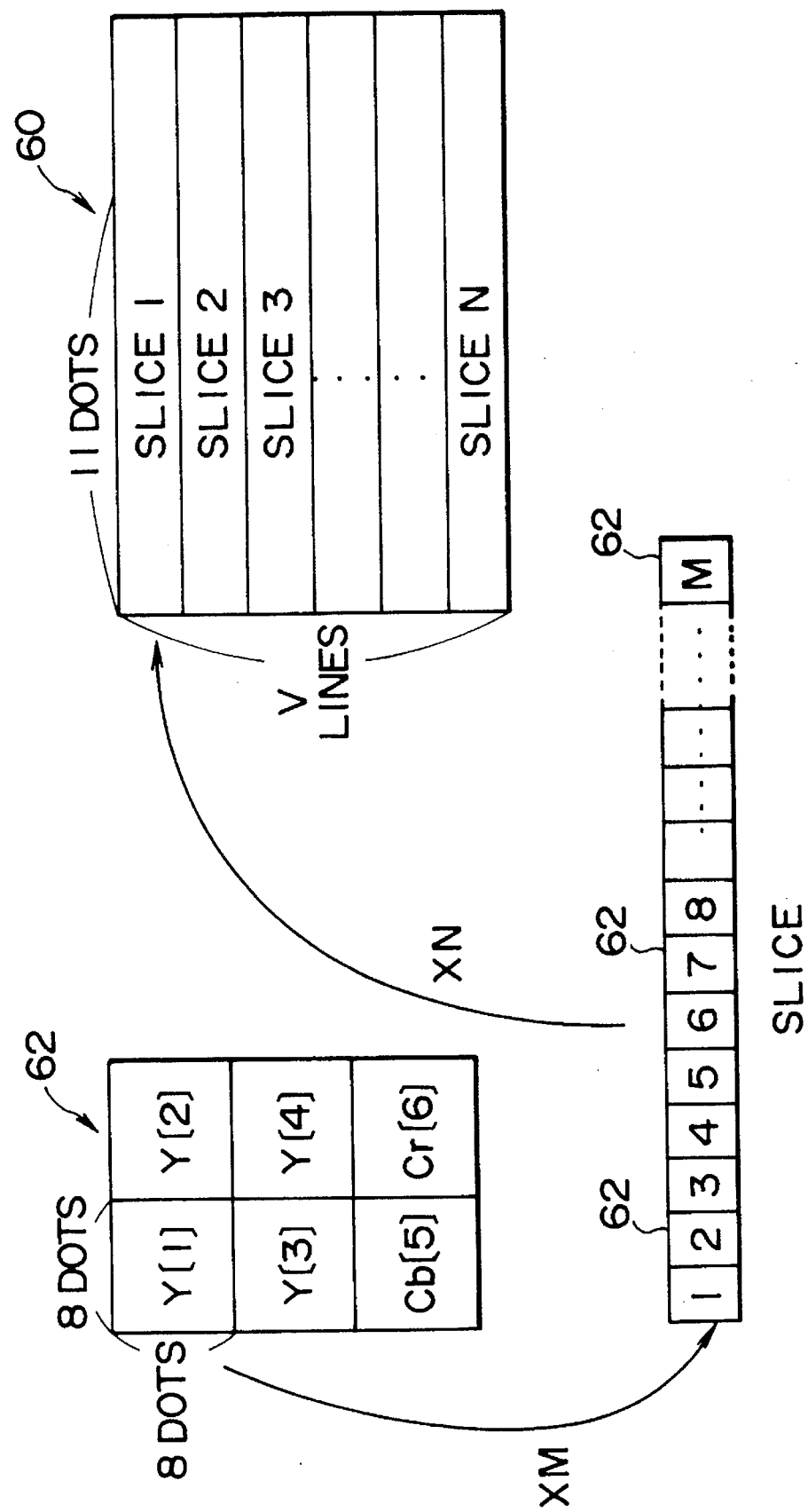
FIG. 5 is an explanatory diagram used for describing the structure of a motion video picture encoded by the embodiment of FIG. 4.

The data of each field picture is divided into N slices as shown in FIG. 5. Each slice comprises M macroblocks 62, each macroblock comprising four microblocks of luminance-signal data Y1 to Y4 and two microblocks of chrominance-signal data Cb and Cr. Each microblock of the luminance-signal data Y1 to Y4 represents 8×8 pixels. As shown in FIG. 5, each slice includes a raster-scan contiguous array of macroblocks. The picture data is arranged contiguously inside a macroblock in microblock units in raster scanning order.

In the case of the luminance signal, the microblocks Y1 to Y4 in each macroblock are treated as a unit representing 16×16 pixels which are contiguous in both the vertical and horizontal scanning directions. As for the two chrominance signals associated with this unit, on the other hand, the data undergoes quantity-reduction processing prior to a time-axis multiplexing process and the resulting data representing 16×16 pixels is assigned to the appropriate one of microblocks Cr and Cb.

Figure 6A:
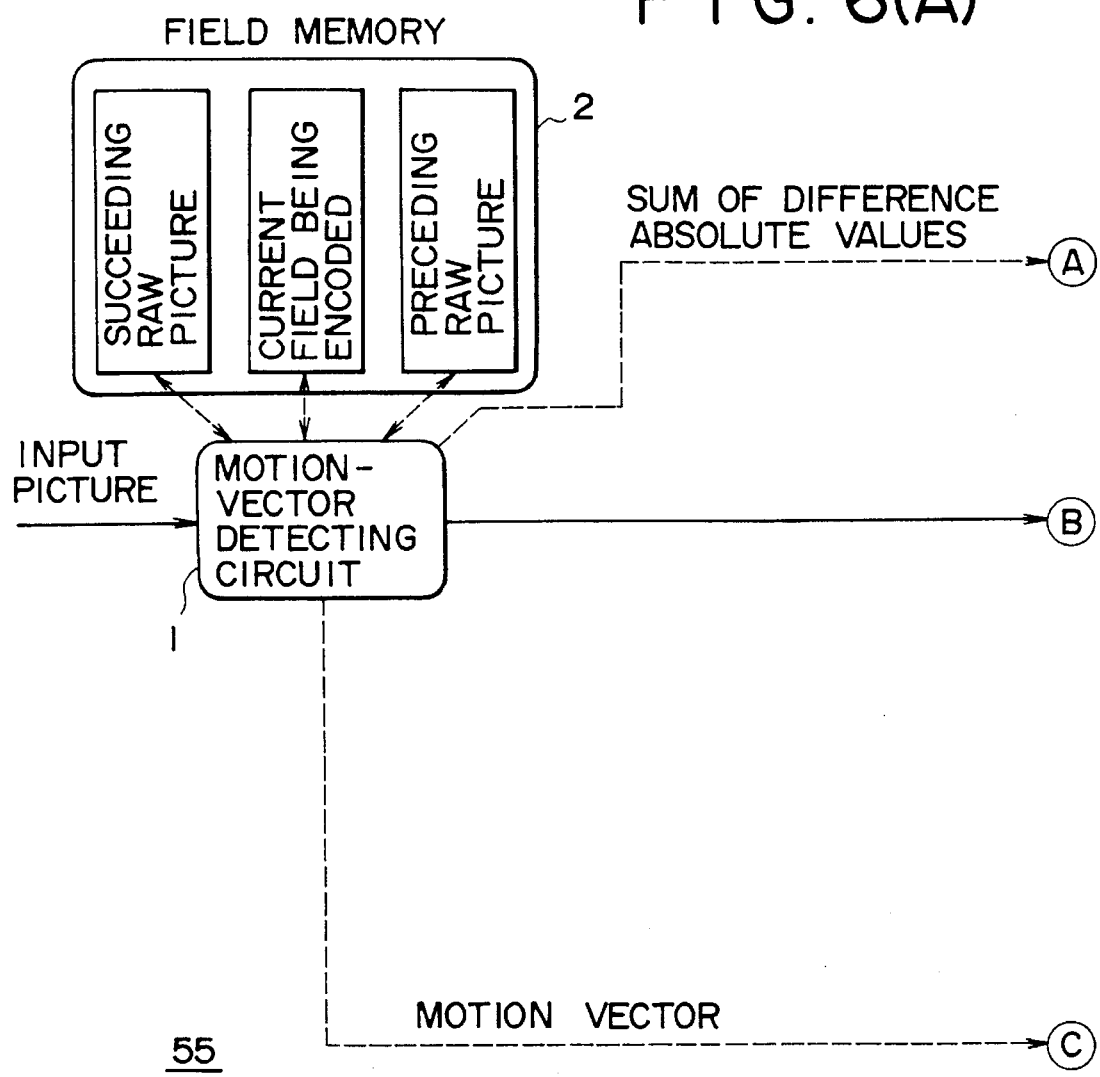
FIG. 6 is a block diagram of a first embodiment of an encoder of the FIG. 1 embodiment.
Figure 6:
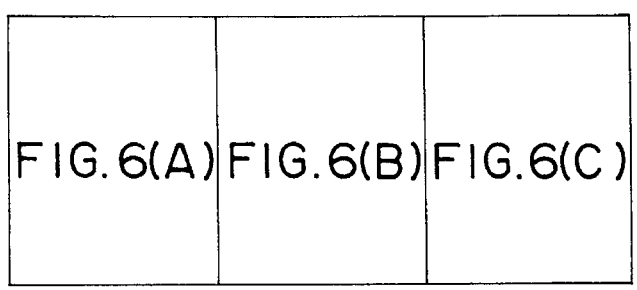
Figure 6B:
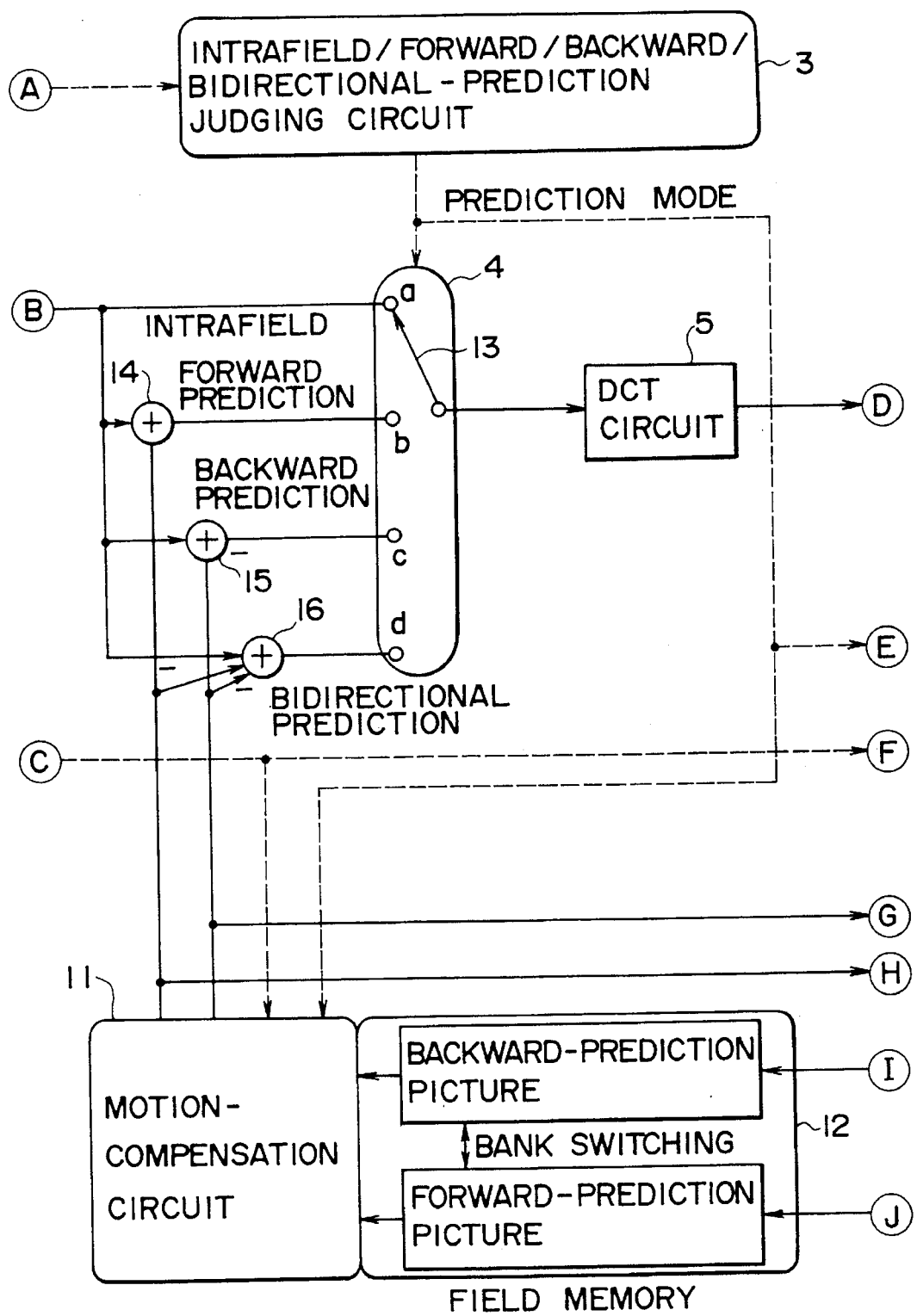
Figure 6C:
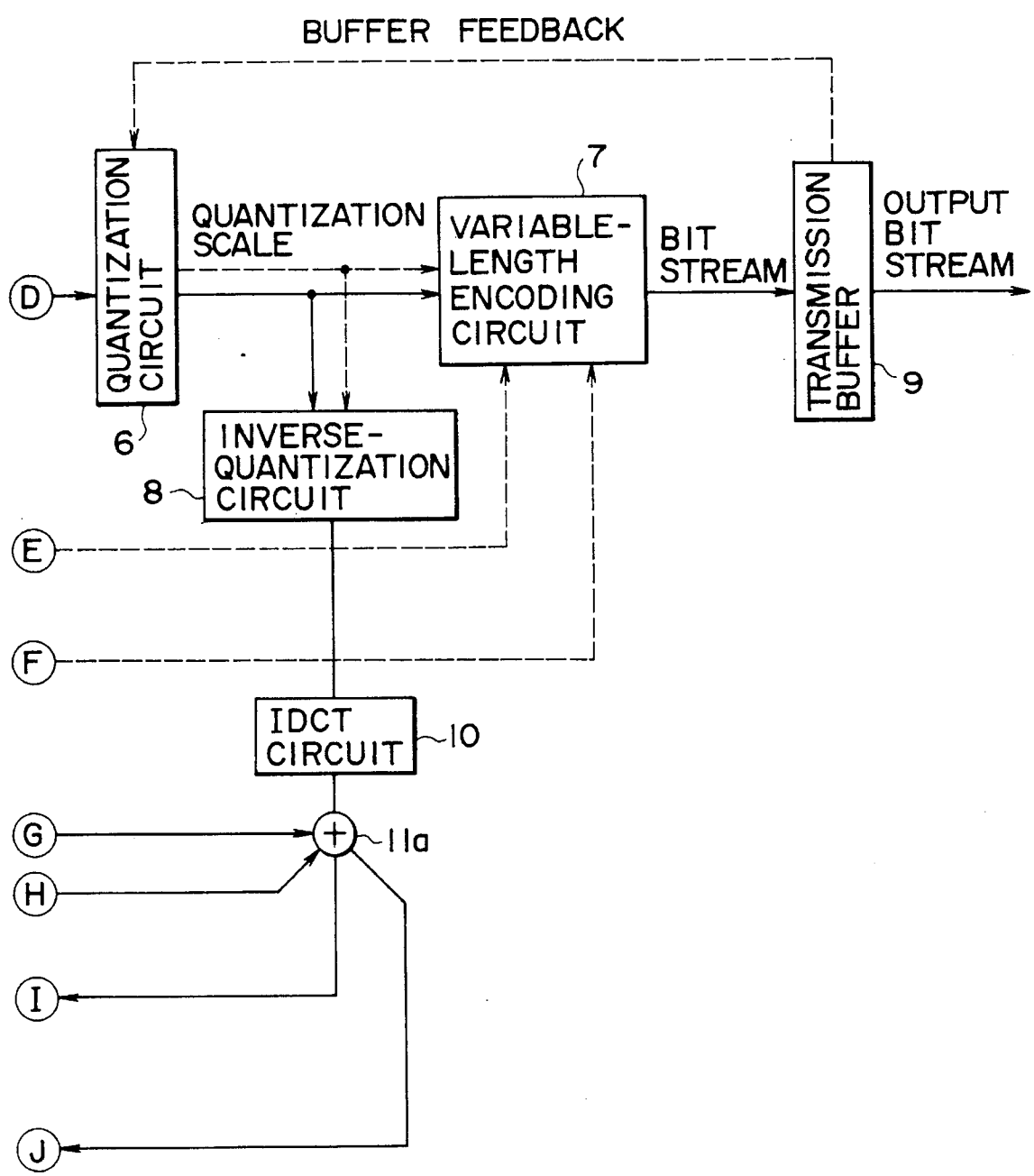

In the encoder 55, processing is carried out in macroblock units. A detailed block diagram of the encoder 55 is shown in FIG. 6.

Picture data to be encoded is supplied to a field memory unit 2 to be stored therein in macroblock units through a motion-vector detecting circuit 1.

By using a forward (preceding) raw picture and/or a backward (succeeding) raw picture stored in the field memory unit 2, the motion-vector detecting circuit 1 selects a motion vector between the stored picture and a field picture currently being encoded as that one of a plurality of possible motion vectors which minimizes the sum of the absolute values of differences between fields taken in block units.

It should be noted that the motion-vector detecting circuit 1 processes picture data of each field in a predetermined sequence in accordance with an I-field picture encoding mode, a P-field picture encoding mode or a B-field picture encoding mode, which are described below, in accordance with a predetermined sequence. Field pictures which are input sequentially are processed as either I, P or B-field pictures or in a predetermined sequence of I, P and B-field pictures which is repeated for each successive group comprising 16 fields, also referred to as a group of pictures (GOP), which are processed in sequence as B, B, I, P, B, B, P, P, B, B, . . . , P and P-field pictures.

In this example, an I-field picture is an intra coded picture which is coded in the intrafield encoding mode, a process which employs picture data only from the field being encoded.

A P-field picture is a predictive coded picture which is either intrafield encoded and/or predicted in the forward direction (or backwardly-predicted from the other field of the same frame) thereby undergoing interfield encoding. The fields are encoded in macroblock units each including the data of a section of a respective field, and either predictive encoding (as explained above) or intrafield encoding, whichever provides better efficiency, is selected for each macroblock. In the case of predictive encoding, differences are found for each macroblock from a predicted field which is produced through motion-compensation using a timewise-preceding field (or a timewise succeeding field of the same frame) as a base. In predictive encoding, the predicted field is used as a reference to find such differences, also referred to as prediction errors. Here, the timewise-preceding field (or timewise-succeeding field of the same frame) is a field that has already been encoded and subsequently locally decoded. In contrast, intrafield encoding is carried out without finding such differences.

A B-field picture is a bidirectionally-predictive coded picture which can be encoded by intraframe encoding as well as through prediction from either or both directions, forward and backward, thereby undergoing interfield encoding. In practice, either one of these interfield encoding methods or the intrafield encoding method (that is, encoding as is without finding differences), whichever provides better efficiency, is selected for each macroblock. When an interfield encoding method is selected, the prediction errors are found for each macroblock from a predicted field which is produced through motion-compensation using a timewise-preceding field, a timewise-succeeding field or both as a base.

First, in order to select an encoding technique for each macroblock of a field to be encoded, the motion-vector detecting circuit 1 typically finds the sum of the absolute values of prediction errors for each the forward prediction, the backward prediction and the bidirectional prediction methods, as well as a measure of the amount of data which would result from intraframe encoding. Then, the sums of such values are supplied to a prediction judging circuit 3 for use in selecting one of the methods for each macroblock.

In the case of the intrafield method, the difference between $|\Sigma A_{ij}|$ and $\Sigma|A_{ij}|$ is found to provide a measure of the amount of data resulting from intrafield encoding, where $|\Sigma A_{ij}|$ is the absolute value of the sum of signals $A_{ij}$ of microblocks of the field picture being encoded whereas $\Sigma|A_{ij}|$ is the sum of the absolute values of the signals $A_{ij}$. In the case of forward prediction, the sum of absolute values $\Sigma |A_{ij}-B_{ij}|$ is found, where $A_{ij}$ represents the microblock signals of the field being encoded and $B_{ij}$ represents the microblock signals of a preceding raw picture. Therefore, $|A_{ij}-B_{ij}|$ represents the absolute value of the difference between $A_{ij}$ and $B_{ij}$. The sum of the absolute values of prediction errors for backward prediction and that for bidirectional prediction can be found in the same way as forward prediction except that, for backward prediction, the preceding raw picture is replaced by a succeeding raw picture whereas, in the case of bidirectional prediction, the preceding raw picture is replaced typically by an average value of the preceding picture and a succeeding picture.

As mentioned above, the sums of absolute values are supplied to the prediction judging circuit 3. The prediction judging circuit 3 determines the minimum among the sums of the absolute values of the forward prediction, backward prediction and bidirectional prediction methods as an absolute-value sum of the interfield predictions, a generic term for the forward, backward and bidirectional prediction methods. The absolute-value sum of the interfield predictions is further compared to the value representing the amount of data produced by intrafield encoding to select the smaller of the two. The method associated with the smallest value is selected as the encoding mode. If the absolute-value sum of interfield predictions is found to be smaller than the value for intrafield encoding, that one of the forward, backward and bidirectional predictions that yields the minimum sum is chosen as the encoding mode. Otherwise, the intrafield method is selected as the encoding mode.

As described above, the motion-vector detecting circuit 1 helps the prediction judging circuit 3 choose an encoding mode and determine a detected motion vector between a picture being encoded and a predicted picture associated with the prediction mode which is selected by the prediction judging circuit 3 among the three predictions, that is, the forward, backward and bidirectional predictions. The detected motion-vector is then supplied to a variable-length encoding circuit 7 and a motion-compensation circuit 11.

A switching circuit 4 has an output terminal 13 selectably connectable to one of four input terminals a, b, c and d for each macroblock of the field being encoded, the state of the switching circuit 4 being determined based on the encoding mode selected by the prediction judging circuit 3.

In the intrafield encoding mode, the output terminal 13 is connected to input terminal a, supplying the picture being encoded to a discrete cosine transform (DCT) circuit 5 as is.

In the forward, backward and bidirectional prediction modes, the output terminal 13 is connected to input terminals b, c and d, respectively. In these prediction modes, difference data obtained by subtracting a forward, backward or bidirectional-predicted picture from the picture being encoded is produced by a respective subtracting circuit 14, 15 or 16. The difference data is then supplied to the DCT circuit 5.

The DCT circuit 5 performs discrete cosine transformation on the input picture or the difference data supplied thereto in block units which serves to further compress the picture data due to the two-dimensional correlation of the picture signal. Data resulting from the discrete cosine transformation is output to a quantization circuit 6.

The quantization circuit 6 quantizes the DCT data in quantization step sizes which are determined for each macroblock or each slice. Data resulting from the quantization processing appears at an output terminal of the DCT circuit 5 and is supplied to a variable length code (VLC) circuit 7 and an inverse-quantization circuit 8. A signal representing the amount of residual data left in a transmission buffer memory unit 9 is fed back to the quantization circuit 6 as a feedback signal for use in setting a quantization scale adopted in the quantization process at a value that does not destroy the contents of the transmission buffer memory unit 9. The quantization scale is also supplied to the variable-length encoding circuit 7 and the inverse-quantization circuit 8, and is also included with the data resulting from the quantization processing.

The VLC circuit 7 performs variable-length encoding on the quantized data, the quantization scale, the prediction mode and the motion vector, supplying them to the transmission buffer memory unit 9 as transmission data.

Once stored in the transmission buffer memory unit 9, the transmission data is output as a bit stream having a constant, predetermined bit transmission rate. At the same time, a quantization control signal representing the amount of residual data remaining in the transmission buffer memory unit 9 is fed back for each macroblock unit to the quantization circuit 6 in order to control the quantization scale. The transmission buffer memory unit 9 can thereby adjust the amount of data to be generated as a bit stream, allowing a proper amount of data therein to be sustained. The proper amount of data causes neither overflow resulting in loss of data, nor underflow resulting in transmission of all data in the buffer unit 9 before new data is received, so that the transmission rate is reduced.

If the amount of residual data in the transmission buffer memory unit 9 exceeds an allowable maximum limit for some reason, a quantization control signal is output to increase the quantization scale used in the quantization circuit 6, hence, decreasing the amount of the quantized data.

If the amount of residual data in the transmission buffer memory unit 9 goes below an allowable minimum limit for some reason, on the other hand, a quantization control signal is output to decrease the quantization scale used in the quantization circuit 6, hence, increasing the amount of the quantized data.

As will be described in greater detail hereinbelow, the bit stream output by the transmission buffer memory unit 9 is typically multiplexed with, among other things, an encoded audio signal and a synchronization signal. Error-correction codes are further added to the bit stream and, after undergoing predetermined modulation, the bit stream is stored on a recording medium such as an optical disk by means of a laser beam, as described in greater detail below. In other applications, the bit stream is transmitted, for example, by broadcast or another transmission mode.

The inverse-quantization circuit 8 performs inverse-quantization on representative values of the quantized data received from the quantization circuit 6, converting them into inverse-quantized data. That is to say, the quantized data is decoded to yield inverse-quantized data, which is equivalent to the data supplied to the input of the quantization circuit 6. The inverse-quantized data is supplied to an inverse discrete cosine transform (IDCT) circuit 10.

The IDCT circuit 10 performs conversion processing (which is the inverse of that carried out by the DCT circuit 5) on the inverse-quantized data from the inverse-quantization circuit 8. The inverse-quantized data is converted by the IDCT circuit 10 into picture data which is then output to a summing circuit 11a. The summing circuit 11a adds a predicted picture, which is an output from the motion-compensation circuit 11 based on the prediction mode, to the picture data received from the IDCT circuit 10. In this way, the circuit 11a can output decoded picture data which is essentially the same as the original picture data. This picture data which is obtained by such local decoding process is stored in the field memory unit 12 as a picture for use in subsequent forward, backward or bidirectional prediction processes. The field memory unit 12 is capable of bank switching from the forward-prediction picture to the backward-prediction picture or vice versa, allowing a single field to be read out as a picture for use in the forward or backward prediction mode depending upon the picture to be encoded.

The motion-compensation circuit 11 carries out motion-compensation on the locally decoded picture read out from the field memory unit 12 in accordance with the prediction mode and the appropriate motion vector for each macroblock in order to produce a predicted picture to be supplied to the subtracting circuits 14, 15 and 16 and the summing circuit 11a. To be more specific, the motion-compensation circuit 11 shifts the read address of the field memory unit 12 by a displacement corresponding to the appropriate motion vector, but only if operating in the forward, backward or bidirectional prediction mode. In the forward or backward prediction mode, the motion-compensation circuit 11 then reads out data at the shifted read address, producing a predicted picture. In the bidirectional-prediction mode, both forward and backward predicted pictures are output as predicted-picture data.

In the case of forward, backward or bidirectional prediction, the data transmitted by the IDCT circuit 10 represent differences between the picture being encoded and the predicted picture. The differences are added by the summing circuit 11a to the predicted picture received from the motion-compensation circuit 11 as a local decoding process. The local decoding process carried out by the summing circuit 11a produces a predicted picture substantially the same as a picture that will be obtained from a decoding process by a decoder after reproduction or other transmission. As described above, the output of the summing circuit 11a is stored in the field memory unit 12 as a picture for use in the forward, backward or bidirectional prediction processes for a picture to be locally decoded subsequently.

In the intrafield encoding mode, the picture data itself, rather than difference data, is supplied to the IDCT circuit 10. Accordingly, the summing circuit 11a outputs the picture data to the field memory unit 12 to be stored therein as is.

It should be noted that the quantization circuit 6 only outputs I and P-field picture data to the inverse-quantization circuit 8, supplying no data thereto for a B-field picture. Accordingly, only data for I and P-field pictures is stored in the field memory unit 12 and there is thus no data for a B-field picture stored therein. This is because B-field picture data is not used in the forward, backward and bidirectional predictions.

Figure 7:
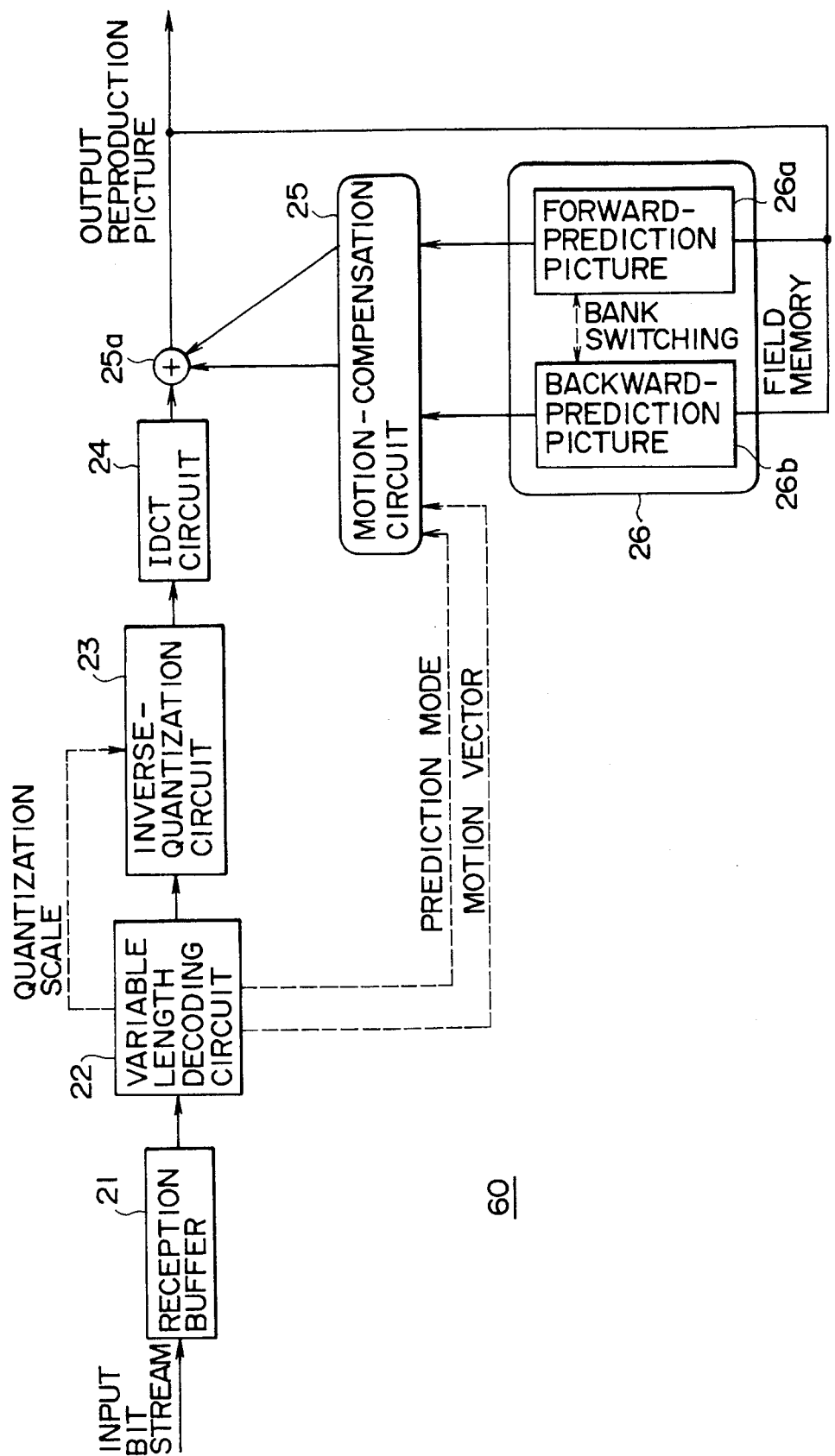
FIG. 7 is a block diagram of a decoder in accordance with an embodiment of the present invention.

With reference now to FIG. 7, a decoder 60 is illustrated therein having an input 62 which receives a bit stream from a transmission medium such as a bit stream reproduced from an optical disk by means of a laser beam. The data reproduced from the transmission medium undergoes predetermined demodulation prior to an error-correction process. In addition, if the reproduced data is multiplexed with an audio signal, a synchronization signal and the like, these multiplexed signals are separated from the reproduced data to yield a bit stream for the picture signal only. The picture signal bit stream is fed to a variable length decoding circuit (IVLC) circuit 22, a kind of variable-length decoder, through a reception buffer 21. The variable-length decoder 22 decodes the quantized data, the motion vector, the prediction mode and the quantization scale conveyed by the bit stream into individual variable-length codes. The variable-length codes for the quantized data and the quantization scale are supplied to an inverse-quantization circuit 23.

Based on the quantization scale received from the variable-length decoder 22, the inverse-quantization circuit 23 carries out an inverse-quantization process on the quantized data also received from the variable-length decoder 22, outputting inverse-quantized data in the form of DCT data. An inverse discrete cosine transformation (IDCT) circuit 24 then performs IDCT processing on the DCT data received from the inverse-quantization circuit 23.

In addition, a motion-compensation circuit 25 carries out motion-compensation on a previously decoded picture read out from a field memory unit 26 in accordance with the prediction mode and the motion vector for each macroblock to be decoded in order to produce a predicted picture to be supplied to a summing circuit 25a. To be more specific, the motion-compensation circuit 25 shifts the read address of the field memory unit 26 from the location of a picture-data block just output from the IDCT 24 to the summing circuit 25a, by a displacement corresponding to the motion vector received from the variable-length decoder 22, but only if the encoding mode is either the forward, backward or bidirectional prediction mode. The motion-compensation circuit 25 then reads out data at the shifted read address to be used as a reference in forward or backward prediction, producing a predicted picture. That is to say, the data read out from the field memory unit 26 is output as predicted-picture data.

In the forward, backward or bidirectional prediction mode, differences from the predicted picture (also termed prediction errors) are output by the IDCT circuit 24. The differences are added by the summing circuit 25a to the predicted picture received from the motion-compensation circuit 25 in the decoding process. The decoded data output by the circuit 25a is stored in the field memory unit 26 as picture data for use in the decoding of a subsequent picture encoded by forward, backward or bidirectional prediction.

In the intrafield-prediction mode, the picture data itself is output by the IDCT circuit 24. Accordingly, the circuit 25a outputs the picture data to the field memory unit 26 to be stored therein as is. Much like the decoded data described above, the picture data output as is by the circuit 25a is stored in the field memory unit 26 as picture data also for use in the decoding of a subsequent picture encoded by forward, backward or bidirectional prediction.

The field memory unit 26 undergoes bank switching from the forward-prediction picture to the backward-prediction picture or vice versa, allowing a single field to be read out as a picture for use in forward or backward prediction depending upon the picture to be decoded.

The predicted picture is essentially the same as a picture that will be obtained from local encoding by the encoder. Based on this predicted picture, a picture to be decoded next which may be a P or B-field picture is decoded by forward, backward or bidirectional prediction.

It should be noted that only data for I and P-field pictures are stored in the field memory unit 26 and, thus, there is no B-field picture data stored therein. This is because such data is not used in the forward, backward and bidirectional predictions.

It will be appreciated that the encoder and decoder of the first embodiment can be readily implemented to selectably enable decoding either on a field unit basis or a frame unit basis.

Figure 8:
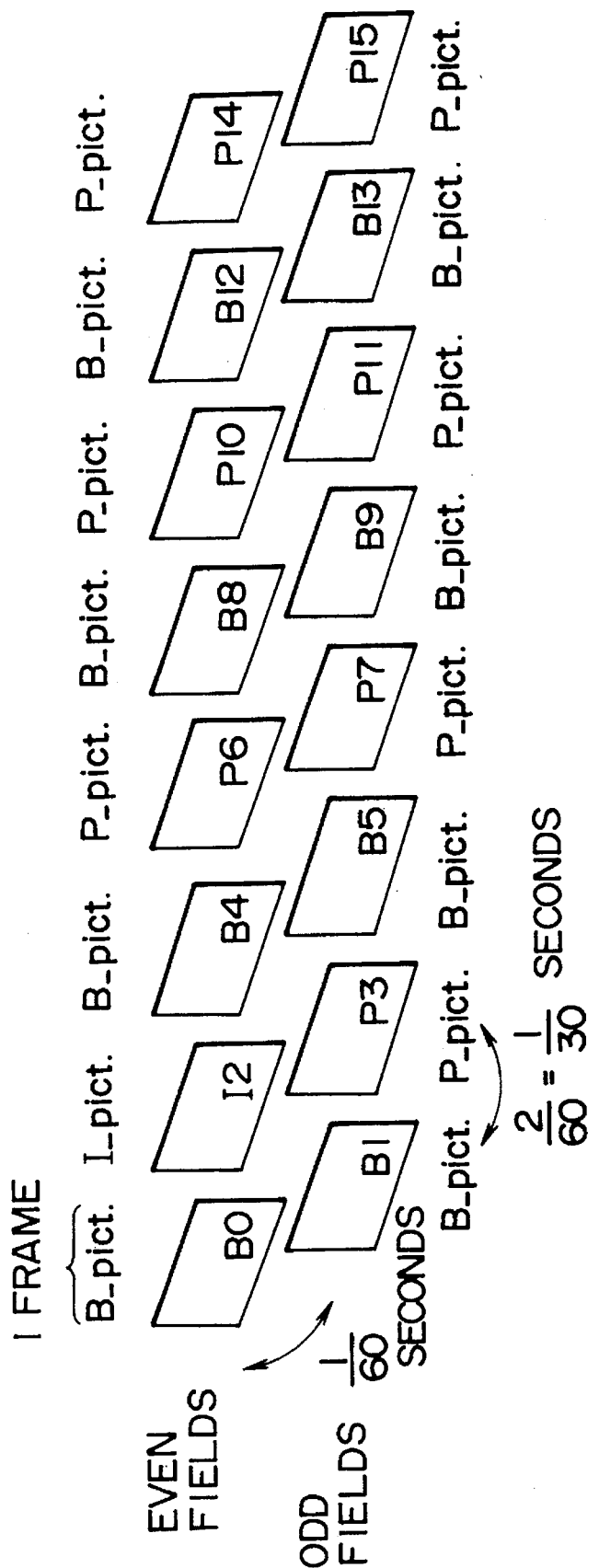
FIG. 8 is an explanatory diagram used for describing an encoding sequence for a group of pictures (GOP) of an interlaced scan picture signal.

The following description explains how to predict an interlaced picture signal using an embodiment of an encoding technique according to the present invention. If fields of interlaced pictures are placed side by side, an encoding sequence in accordance with one embodiment of the present invention, illustrated in FIG. 8, is obtained, wherein even and odd fields are aligned in the upper and lower rows respectively. A pair of vertically adjacent fields in the upper and lower rows constitute a frame. The modifiers 'even' and 'odd' are used merely for the purpose of simplifying the explanation. Odd and even fields can also be aligned in the upper and lower rows respectively as opposed to the illustrative arrangement described above.

If one of two fields constituting a frame is an I-field picture, the other can be an I or P-field picture. In other words, if one of them is a P-field picture, the other is an I or P-field picture. If one of them is a B-field picture, however, the other must also be a B-field picture as well.

That is to say, a frame may comprise the following combinations of fields as follows:

I-field picture and I-field picture
I-field picture and P-field picture
P-field picture and I-field picture
P-field picture and P-field picture
B-field picture and B-field picture The diagram shown in FIG. 8 is drawn with a horizontal axis representing the lapse of time. The upper field is misaligned from the lower field of the same pair in the horizontal direction by a field period of typically 1/60 second. Similarly, the lower field is misaligned from the upper field belonging to the same pair in the horizontal direction by the field period. Accordingly, two adjacent upper fields are separated from each other in the time-axis direction by twice the field period which is 1/30 second long in this case. Likewise, two adjacent lower fields are separated from each other in the time-axis direction also by twice the field period.

As described earlier, frames each comprising a pair of fields are shown in FIG. 8. The number of B-field pictures, fields which may undergo bidirectional-prediction encoding and which are sandwiched by P-field pictures, is variable because there is no restriction on the gap between P-field pictures.

In the illustration of FIG. 8, Field 2 is an I-field picture, so that it is intrafield encoded. Fields 3, 6, 7, 10, 11, 14 and 15 are all P-field pictures, fields which may also undergo a forward-prediction encoding process. Fields 0, 1, 4, 5, 8, 9, 12 and 13 are all B-field pictures, fields which may also undergo a bidirectional-prediction encoding process. These B-field pictures may be predicted from the forward or backward direction or from both directions. The encoding of a P or B-field picture is actually carried out by switching from intrafield encoding to prediction encoding or vice versa for each macroblock if necessary to increase the encoding efficiency. Thus, encoding of a P or B-field picture may include intrafield encoding of one or more macroblocks thereof.

Figure 9A:
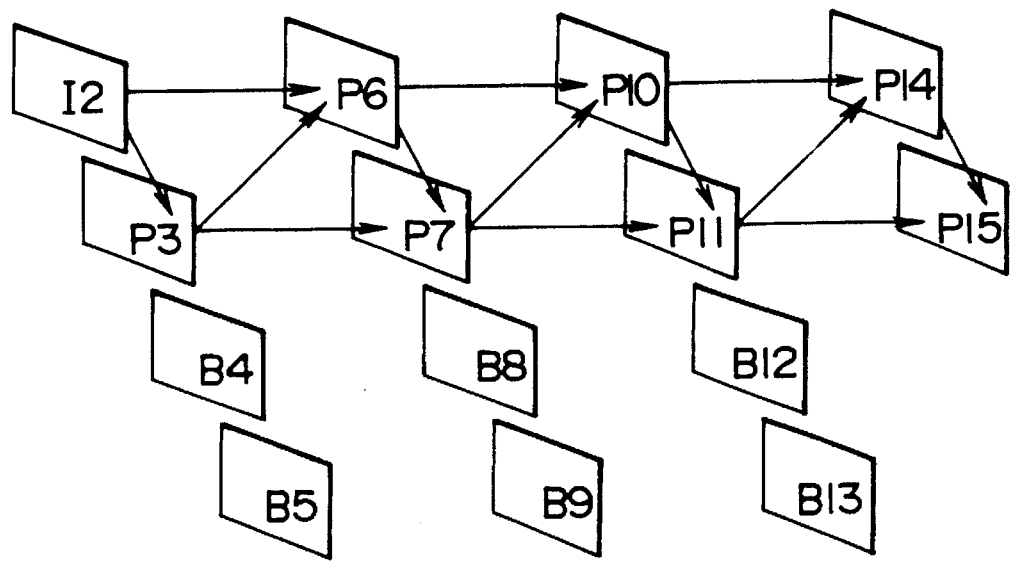
FIGS. 9A and 9B are explanatory diagrams used for describing P-field picture prediction encoding techniques in accordance with certain aspects of the present invention.
Figure 9B:
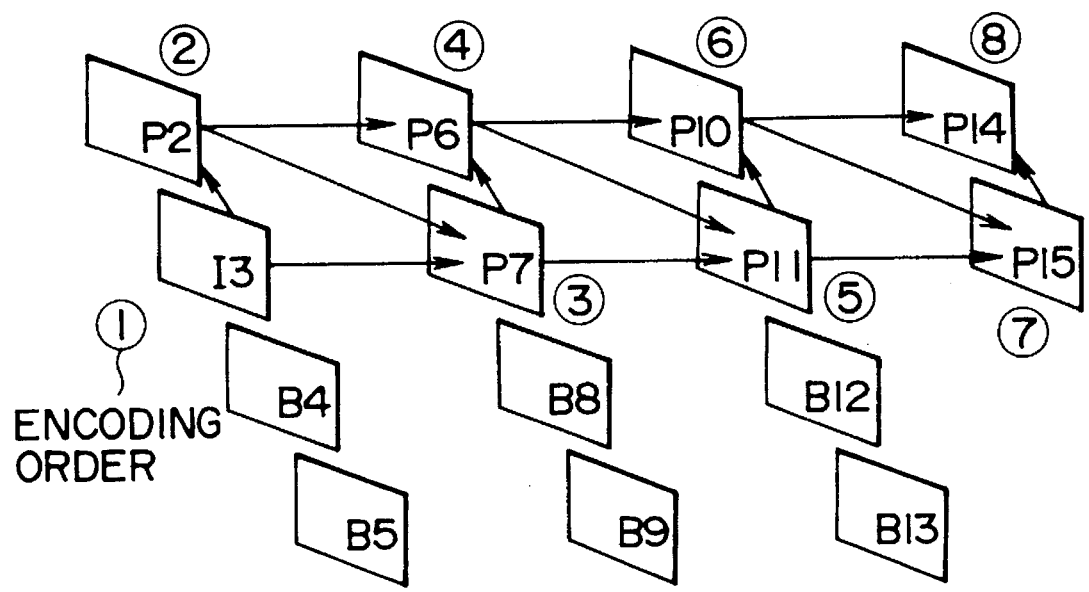
Figure 10:
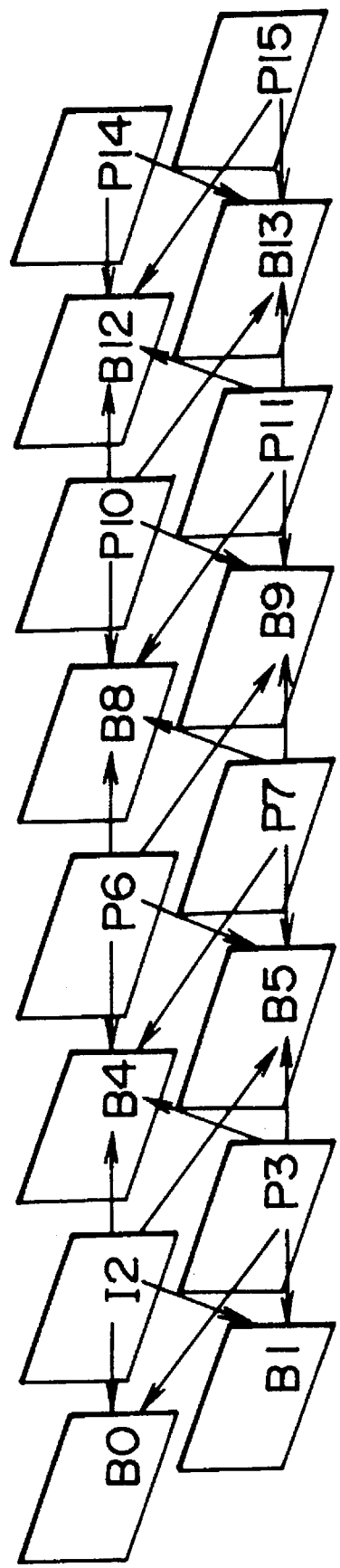
FIG. 10 is an explanatory diagram used for describing a B-field picture prediction encoding technique in accordance with certain aspects of present invention.

In this embodiment, each picture is predicted as shown in FIGS. 9A, 9B and 10. First of all, a P-field picture may be predicted as shown in FIG. 9A. As shown in FIG. 9A, a P-field picture is predicted from the two most recently encoded I or P-field pictures. For example, P3 is predicted from I2 only, whereas P6 is predicted from I2 and P3. A B-field picture, on the other hand, is predicted as shown in FIG. 10. As shown therein, a B-field picture is predicted from the four most recently encoded fields among I or P-field pictures preceding and succeeding the field of the B-field picture being predicted. For example, B4 is predicted from I2, P3, P6 and P7. B5 is predicted in the same way as B4. More particularly, each B-field picture is bidirectionally predicted four ways, in each instance using a different pair of fields each including a timewise-preceding P or I-field picture and a timewise-succeeding picture.

As described above, a picture is predicted by using the most recently encoded P or I fields, since these are the closest P and I fields in time. Accordingly, prediction errors can be made smaller to provide highly efficient prediction encoding.

Figure 11:
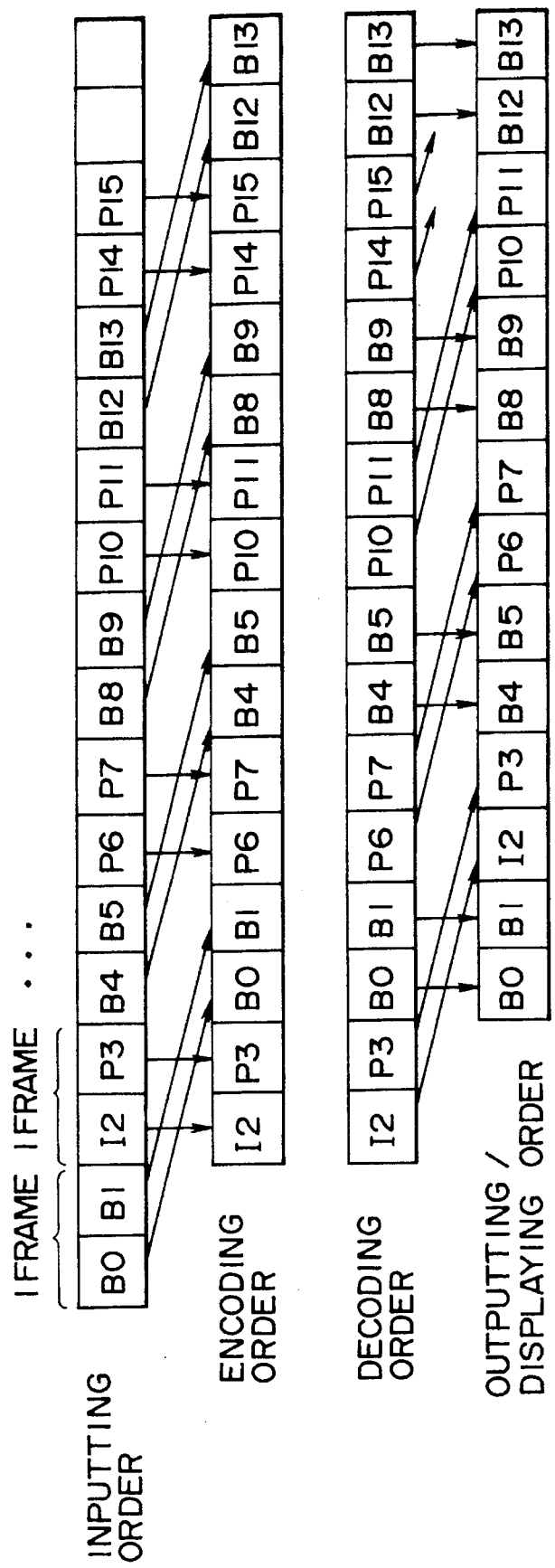
FIG. 11 is an explanatory diagram used for describing input, encoding, decoding and output picture sequences for an interlaced scan picture signal in accordance with certain aspects of the present invention.

Sequences for encoding and decoding the fields that will enable such a prediction technique are shown in FIG. 11. In the prediction embodiment of FIG. 11, two fields that constitute a frame are always encoded one after another. For example, I2 and P3 constituting a frame are first encoded one after another and then B0 and B1 constituting a frame are encoded one after another. Subsequently, P6 and P7 constituting a frame are encoded one after another. Similarly, B4 and B5 also constituting a frame are encoded one after another. This contiguous encoding is continued with field pairs P10 and P11, B8 and B9, P14 and P15, B12 and B13, . . . which each form a frame, one pair after another.

Much like the encoding operation, a pair of fields constituting a frame are also decoded one after another as well. For example, I2 and P3 constituting a frame are first decoded one after another and then B0 and B1 constituting a frame are decoded one after another. Subsequently, P6 and P7 constituting a frame are decoded one after another. Similarly, B4 and B5 also constituting a frame are decoded one after another. This contiguous decoding process is continued with pairs P10 and P11, B8 and B9, P14 and P15, B12 and B13, . . . which each form a frame, one pair after another.

Random access to a bit stream, for example, to access a desired location in a bit stream recorded on a disk in a fast forward mode, is facilitated by the present embodiment in which pairs of contiguous fields constituting a frame are always encoded one after another. Therefore, the two contiguous fields forming a frame are also represented by continuous data in a bit stream. When decoding a frame from data in such a bit stream, and especially when accessing a desired frame randomly, it is thus not necessary to access data at widely displaced positions in the bit stream. As a result, data of the desired frame can be obtained with a high degree of efficiency.

It will be seem from the sequences in which fields are input, encoded, decoded and transmitted, as shown in FIG. 11, that the encoding technique of the present embodiment may be readily modified to carry out frame-by-frame encoding. Since two contiguous fields constituting a frame are encoded one after another as described before, the necessary modification is very easy to implement. That is to say, it is possible to switch with ease from the field encoding technique provided by the present invention to a frame-by-frame encoding method.

In the embodiment described above, the upper field of the two fields forming a frame is first encoded (or decoded) and, after that, the lower field lagging behind the upper field by 1/60 second is then encoded (or decoded). In the example shown in FIG. 9B in which Field 3 is an I-field picture, however, the lower field of the two fields forming a frame can also first be encoded (0r decoded) and, after that, the upper field lagging behind the lower one by 1/60 second can then be encoded (or decoded).

Also in this case, the P-field picture is predicted from the two most recently decoded fields among the I or P-field pictures encoded before the field of the P-field picture currently being predicted. As described earlier, this prediction technique also applies to a B-field picture in a similar way. Consider an example in which encoding of I and P-field pictures only is considered, as shown in FIG. 9B. As shown therein, encoding is performed in the following order: I3, P2, P7, P6, P11, P10, P15, P14, . . . In this case, P2 is predicted from I3 only whereas P6 is predicted from P2 and P7.

In the example described above, P6, a P-field picture, is predicted not only from P2, a preceding field, but also from P7, a succeeding field which was encoded earlier. In other words, the succeeding field P7, a timewise future picture of P6, is used in the prediction. Since two predictions are thus made available so that the prediction yielding the smallest number of prediction errors may be selected, the number of prediction errors overall can be reduced.

Second Embodiment

In the first embodiment described above, by the way, a large amount of memory is required to be used for prediction as is the case with conventional prediction techniques, with a B-field picture in this embodiment requiring the most memory, since the data of four fields are required to carry out the necessary predictions. In the case shown in FIG. 10, for example, memory capacity for storing the data of four fields I2, P3, P6 and P7 is required in order to predict B4. Note that the number of arrows pointing to B4 as shown in the figure is equal to the number of fields used for predicting B4. Since the size of the memory largely affects the cost of the hardware, it is desirable to reduce the memory size. In addition, the amount of memory used in the encoder affects the size of the memory required in the decoder as well. Since the cost of decoding equipment is less than that of the encoding equipment, but the cost of memory is the same, reducing memory requirements for the decoder provides a very pronounced benefit.

Figure 12:
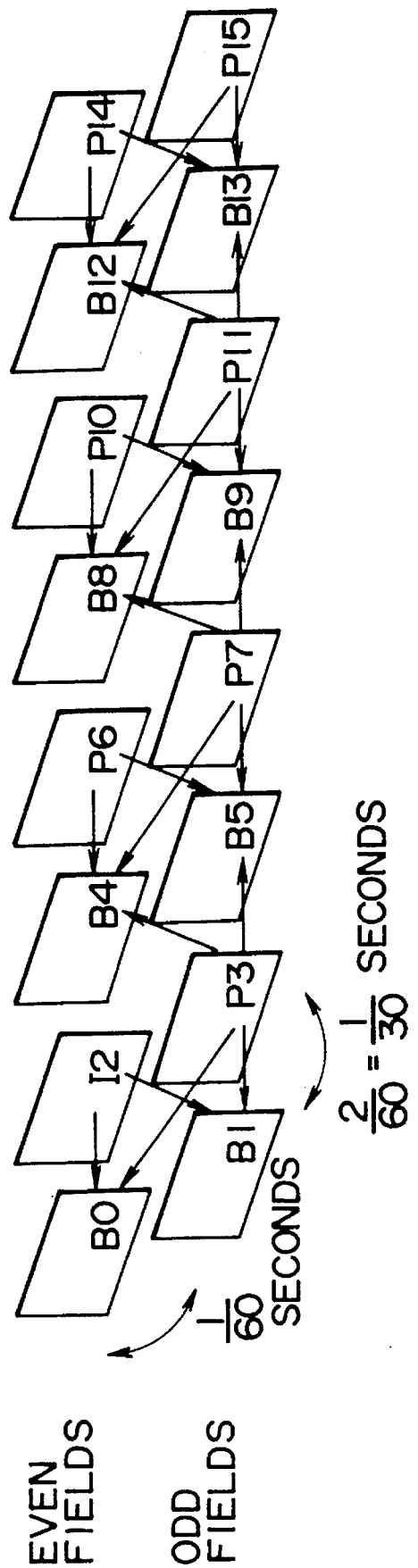
FIG. 12 is an explanatory diagram used for describing a restricted B-field picture prediction encoding technique in accordance with certain aspects of the present invention.

A further embodiment of a prediction technique in accordance with the present invention is illustrated in FIG. 12. As shown therein, the use of even fields of I and P-field pictures for forward prediction is not permitted. Note also that, in this example, even fields are aligned in the upper row. Accordingly, the number of fields being referenced for predicting an upper or lower field of a B-field picture is decreased to three, reducing the memory required in the decoder to a capacity of only three fields.

The sequences for inputting, encoding, transmitting and decoding the fields in the present embodiment are the same as those for the first embodiment and are shown in FIG. 11.

Figure 13:
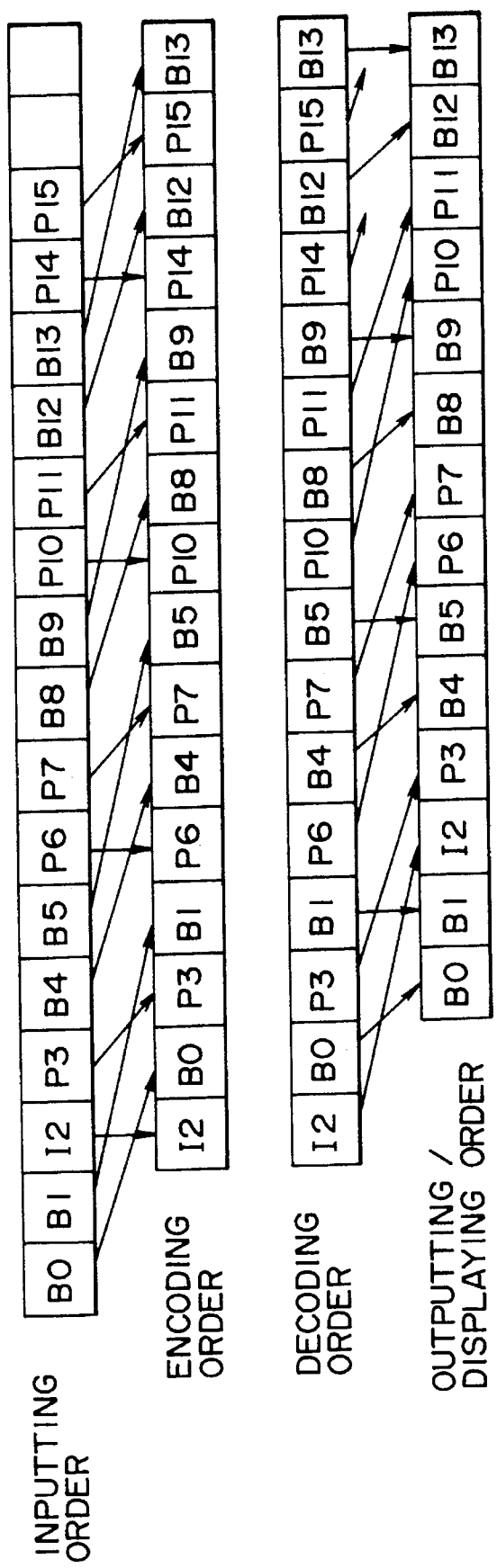
FIG. 13 is an explanatory diagram used for describing input, encoding, decoding and output picture sequences for an interlaced scan picture signal in accordance with certain aspects of the present invention.

In the decoder, a memory capacity of three fields is required as in the case of the encoder. The memory is used for storing pictures which have been decoded in order to later decode a B-field picture. As shown in FIG. 13, however, a decoded B-field picture is output to a display unit without the necessity to delay the decoded picture as in the case of an I or P-field picture. Accordingly, it is not necessary to temporarily store a decoded B-field picture. As a result, the memory required in the decoder can also be reduced to an amount which is only large enough for storing three fields.

Therefore, the amount of memory can thus be reduced, resulting in a lower product cost.

Random access to a bit stream, for example, to access a desired location in a bit stream recorded on a disk in a fast forward mode, is facilitated by the present embodiment in which a pair of contiguous fields constituting a frame are always encoded one after another. Therefore, the two contiguous fields forming a frame are also represented by continuous data in a bit stream. When decoding a frame from data in such a bit stream, and especially when accessing a desired frame randomly, it is thus not necessary to access data at widely displaced positions in the bit stream which would result in reading data of unneeded fields. As a result, the data of the desired frame can be obtained with a high degree of efficiency.

It will be seem from the sequences in which fields are input, encoded, decoded and transmitted as shown in FIG. 11 that the encoding technique of the present embodiment may be readily modified to carry out frame-by-frame encoding. Since two contiguous fields constituting a frame are encoded one after another as described before, the necessary modifications are very easy to implement. That is to say, it is possible to switch with ease from the field encoding technique provided by the present invention to a frame-by-frame encoding method.

Third Embodiment

In the second embodiment described above, the prediction technique is partially restricted. To a certain extent, the prediction efficiency is not optimal, so that picture quality is less than might be desired in some cases. In a third embodiment, the sequences of inputting, encoding, transmitting and decoding the fields are changed in order to reduce the necessary memory capacity to an amount sufficient for storing the data of only three fields without sacrificing prediction efficiency. The inputting, encoding, transmitting and decoding sequences in accordance with the present embodiment which result in a smaller required memory capacity, yet provide highly accurate prediction are shown in FIG. 13.

After encoding the even field of an I or P-field picture, the even field of a B-field picture timewise preceding the I or P-field picture is encoded. Later on, after encoding the odd field of an I or P-field picture, the odd field of a B-field picture timewise preceding the I or P-field picture is encoded. In this way, the processing of a frame comprising B-fields can be completed at P-field picture intervals. Carrying forward the processing in this order also allows the prediction techniques of the first embodiment shown in FIGS. 11 and 12 to be adopted.

In carrying out random access to a bit stream created in the order described above, for example, when accessing the second frame it is necessary to decode I2 and P3. Unfortunately, however, data is stored in the bit stream in the following order: I2, B0, P3, B4 and so on. When reading the data for I2 and P3, the data for B0 is therefore inadvertently obtained as well. The reading of the data of B0 decreases the access speed. However, since B0 is a B-field picture which is mostly the result of bidirectional prediction, the amount of encoded data in B0 is normally smaller than that of an I or P-field picture. As a result, the load imposed by inadvertently reading B0 is not that heavy.

As described above, the processing of a frame is always completed at P-field picture intervals. Since the P-field picture interval can be set arbitrarily, it will be seen that the field-by-field encoding technique of the present embodiment may be designed to facilitate easy conversion of apparatus from field-by-field to frame-by-frame decoding. That is to say, it is easy to switch from the encoding technique in field units provided by the present invention to a frame unit encoding technique.

Fourth Embodiment

Let B4, the upper field of a B-field picture of the second embodiment shown in FIG. 12, be predicted from the following fields:

P3 leading ahead by $1/60$ seconds,

P6 lagging behind by $1/30$ (=$2/60$) seconds and

P7 lagging behind by $1/20$ (=$3/60$) seconds.

On the other hand, let B5, the lower field of the above B-field picture, be predicted from the following fields:

P3 leading ahead by $1/30$ (=$2/60$) seconds,

P6 lagging behind by $1/60$ seconds and

P7 lagging behind by $1/30$ (=$2/60$) second.

From the above data it will be seen that the lower B-field picture is predicted from fields which are timewise closer than the fields from which the upper field is predicted. Accordingly, the upper B-field picture undergoes prediction that is less optimal than that of the lower field since the amount of data representing prediction errors is smaller when the predicted field is nearer the reference field.

Figure 14:
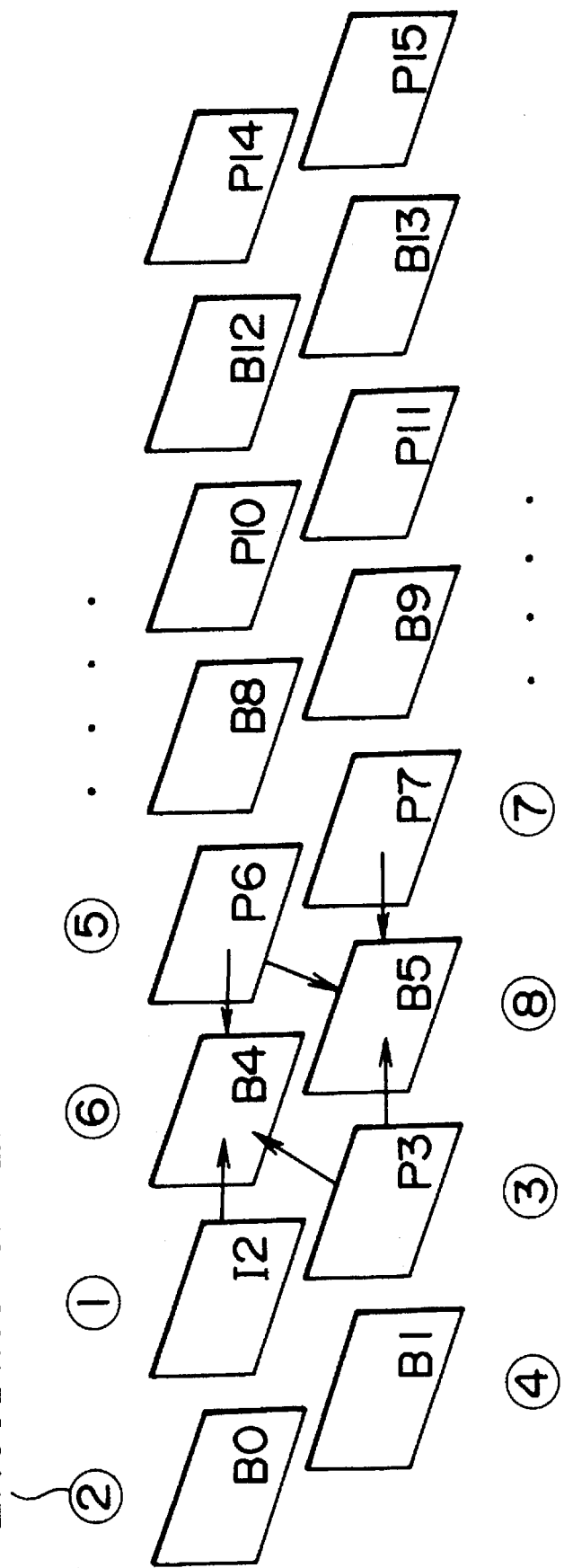
FIG. 14 is an explanatory diagram used for describing a prediction encoding technique in accordance with certain aspects of the present invention wherein time distances to reference pictures are equalized for upper and lower fields.

In order to improve encoding efficiency, B4, the upper field of a B-field picture shown in FIG. 14 is predicted instead, for example, from the following fields:

I2 leading ahead by $1/30$ (=$2/60$) seconds,

P3 leading ahead by $1/60$ seconds and

P6 lagging behind by $1/30$ (=$2/60$) seconds.

Much like the previous example, B5, the lower B-field picture is predicted from the following fields:

P3 leading ahead by $1/30$ (=$2/60$) seconds,

P6 lagging behind by $1/60$ seconds and

P7 lagging behind by $1/30$ (=$2/60$) second.

In this way, the upper field is predicted from fields that, timewise, are as close as those from which the lower field of the same frame is predicted. The number of prediction errors can thus be reduced. It should be noted that the fields are encoded in the increasing order of the circled numbers thereof as shown in FIG. 14.

The pictures shown in FIG. 14 are encoded in biframe units one after another. That is to say, the processing is completed every two frames. Therefore, this prediction technique is also seen to facilitate modifications necessary to switch with ease from the encoding technique in biframe units provided by the present invention to frame unit encoding.

An encoder employed in the second through fourth embodiments is described next with reference to FIG. 15. In this figure, the same reference numerals as those shown in FIG. 6 are used to denote identical components and elements.

Figure 15A:
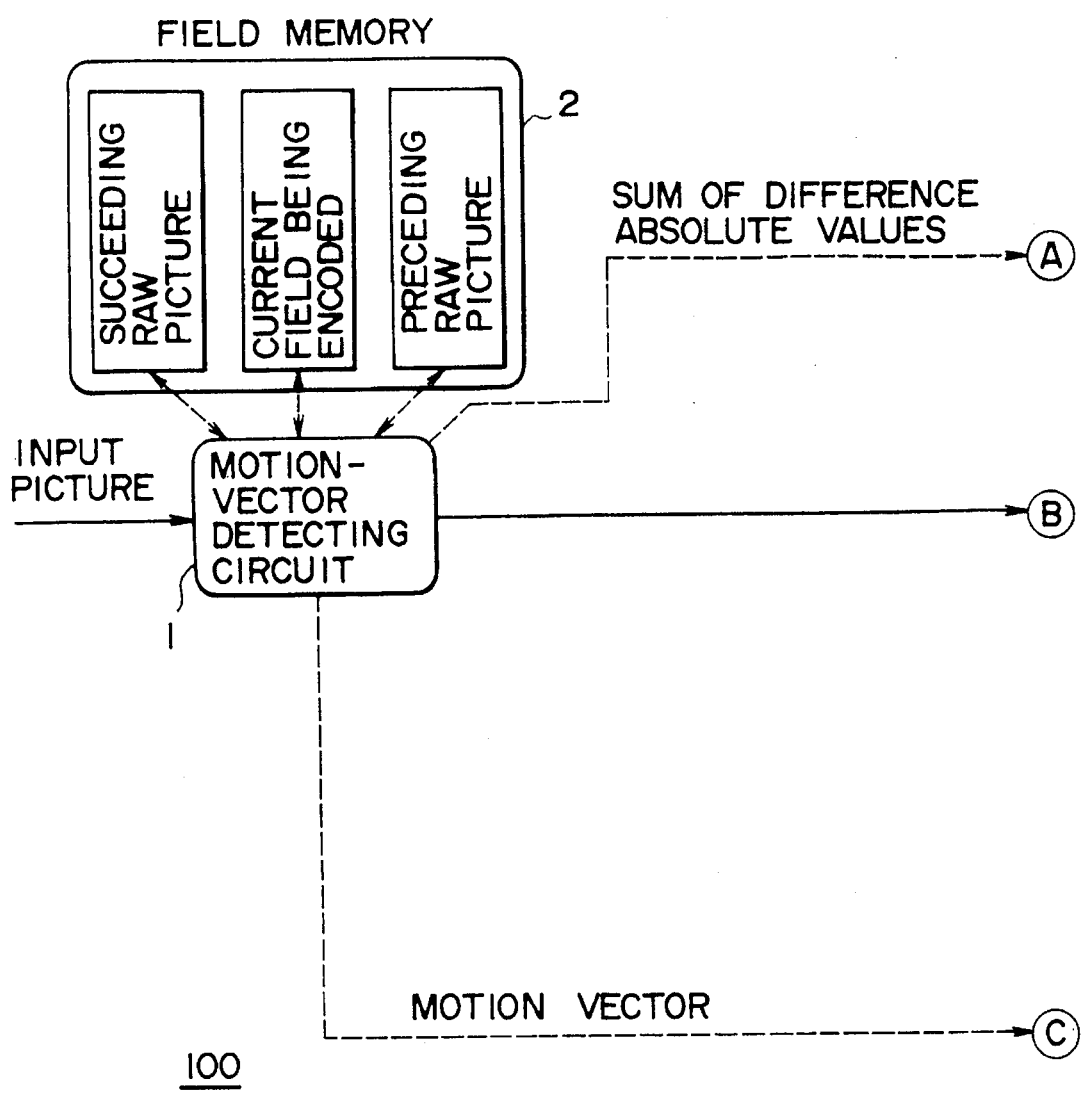
FIG. 15 is a block diagram of an encoder in accordance with second through fourth embodiments of the present invention.
Figure 15:
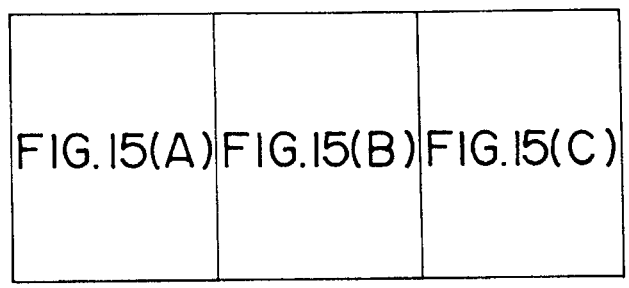
Figure 15B:
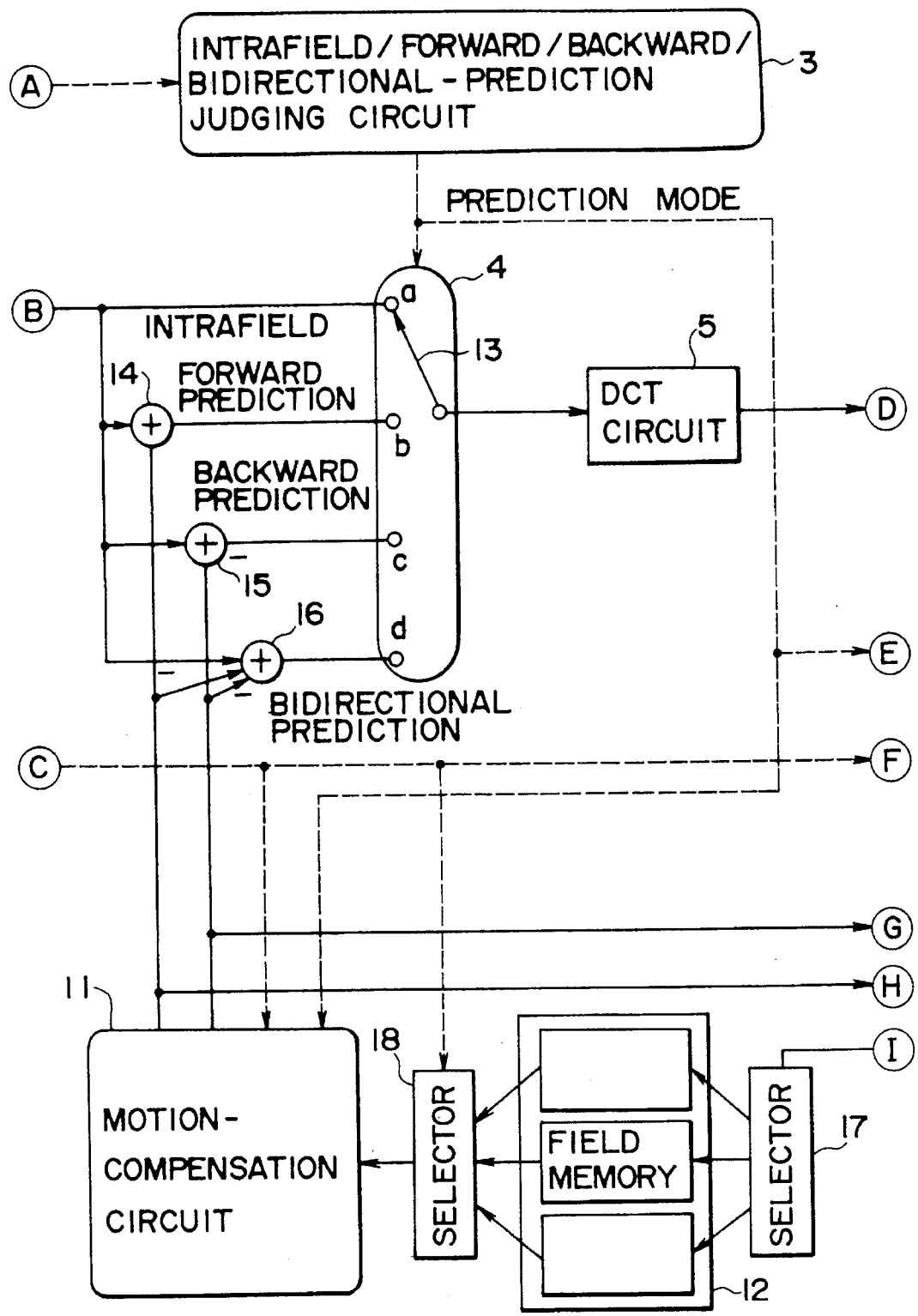
Figure 15C:
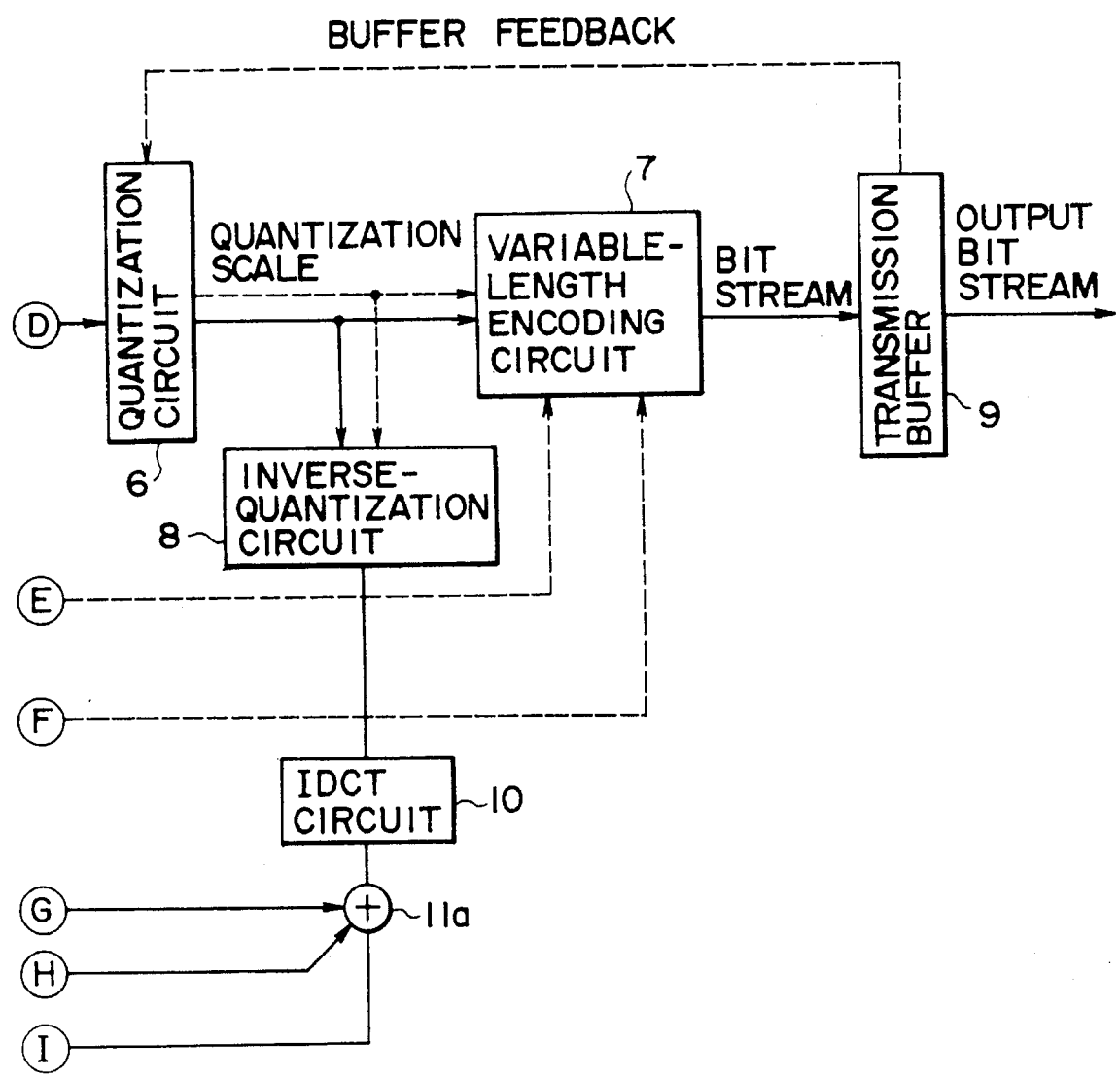

FIG. 15 provides a block diagram of an encoder 100 in which pictures input in block format undergo motion vector detection in a motion-vector detecting circuit 1. By using a forward (preceding) raw picture and/or a backward (succeeding) raw picture stored in the field memory unit 2, the motion-vector detecting circuit 1 detects a motion vector between the stored picture and the picture currently being encoded. As explained in the description of FIG. 6, a detected motion vector is selected from a plurality of possible motion vectors as that one which minimizes the sum of the absolute values of differences between fields taken in macroblock units.

First, in order to select an encoding technique for each macroblock of a field to be encoded, the motion-vector detecting circuit 1 finds the sum of the absolute values of differences between fields in block units. Then, the sums of absolute values for all of the encoding techniques are supplied to a prediction judging circuit 3 for selecting an encoding mode for the macroblock to be encoded.

Based on the predetermined encoding mode of the field that is to be encoded, one of the intrafield, forward, backward and bidirectional encoding techniques is selected. In the intrafield encoding mode, an input picture is supplied to a discrete cosine transform (DCT) circuit 5 as is through a switch 4. In the forward, backward or bidirectional encoding mode, interfield encoding data based on the corresponding predicted picture output from the motion-compensation circuit 11 is supplied to the discrete cosine transform (DCT) circuit 5 also through the switch 4.

Using the two-dimensional correlation of the picture signal, the DCT circuit 5 performs discrete cosine transformation of the input picture or the difference data supplied thereto in macroblock units. Data resulting from discrete cosine transformation is output to a quantization circuit 6.

The quantization circuit 6 quantizes the DCT data in quantization step sizes which are determined for each macroblock or each slice. Data resulting from the quantization processing appears at an output terminal of the circuit 6 and is supplied to a variable length code (VLC) circuit 7 and an inverse-quantization circuit 8. The amount of residual data left in a transmission buffer memory unit 9 is fed back to the quantization Circuit 6 as a feedback signal for use in setting a quantization scale adopted in the quantization process at a value that does not destroy the contents of the transmission buffer memory unit 9. The quantization scale is also supplied to the variable-length code circuit 7 and the inverse-quantization circuit 8, and is also included with the data resulting from the quantization processing.

The VLC circuit 7 performs variable-length encoding on the quantized data, the quantization scale, the prediction mode and the motion vector, supplying them to the transmission buffer memory unit 9 as transmission data.

Once stored in the transmission buffer memory unit 9, the transmission data is output as a bit stream having a constant predetermined bit transmission rate. At the same time, a quantization control signal representing the amount of residual data remaining in the transmission buffer memory unit 9 is fed back for each macroblock unit to the quantization circuit 6 in order to control the quantization scale as described before.

The transmission buffer memory unit 9 can thereby adjust the amount of data to be generated as a bit stream, allowing a proper amount of data therein to be sustained. The proper amount of data causes neither overflow nor underflow in the transmission buffer memory unit 9.

If the amount of residual data in the transmission buffer memory unit 9 exceeds an allowable maximum limit for some reason, a quantization control signal is output to increase the quantization scale used in the quantization circuit 6, hence, decreasing the amount of the quantized data. If the amount of residual data in the transmission buffer memory unit 9 goes below an allowable minimum limit for some reason, on the other hand, a quantization control signal is output to decrease the quantization scale used in the quantization circuit 6, hence, increasing the amount of the quantized data.

The bit stream output by the transmission buffer memory unit 9 is typically multiplexed with, among other things, an encoded audio signal and a synchronization signal. Error-correction codes are also added to the bit stream and, after undergoing predetermined modulation, the bit stream is stored in a recording medium such as an optical disk by means of a laser beam. In the alternative, the bit stream may be recorded on a different form of recording medium such as magnetic tape or disk. In still other applications, after encoding in the foregoing manner, the data may be transmitted, for example, by cable, satellite or over the air.

A technique for manufacturing the optical disk described above is described with reference to FIGS. 16 and 17. As shown in FIG. 16, a raw disk made of glass or the like is, first of all, prepared in a step 102. In a subsequent step 104, the surface of the raw disk is then coated with a recording material made typically of a photoresist substance to produce a raw disk for recording. Software produced according to the process described below is then stored on the raw recording disk.

Figure 17:
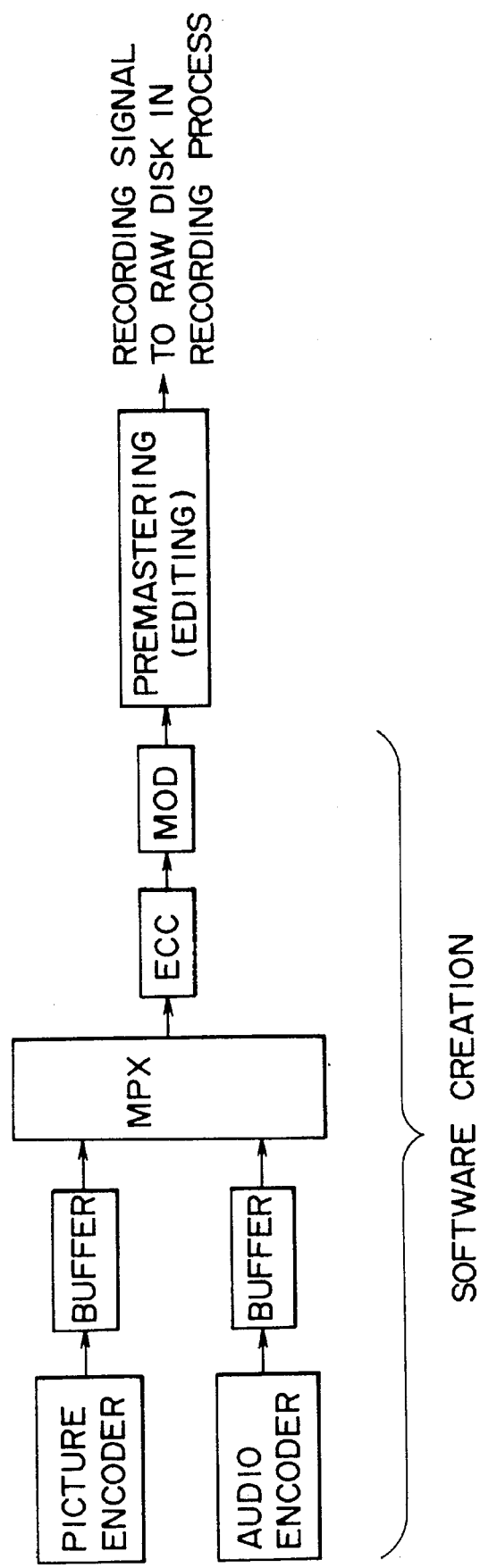
FIG. 17 is a further explanatory diagram used for describing a technique for manufacturing a recording medium in accordance with an aspect of the present invention.

As shown in FIG. 17, picture data resulting from an encoding process by a picture encoder 55, 100 described above is stored in a temporary buffer 120. At the same time, audio data resulting from an encoding process by an audio encoder 124 as mentioned above is stored in another temporary buffer 130. The picture and audio data stored in the temporary buffers 120 and 130 are multiplexed with a synchronization signal by a multiplexer MPX 134. Error-correction codes are then added to the output of the multiplexer MPX 134 by an error correction circuit ECC 140. Subsequently, the output of the error correction circuit ECC 140 undergoes predetermined modulation in a modulator MOD 144. The modulated data output by the modulator MOD 144 is finally stored temporarily in a magnetic tape typically to produce the desired software. The software is to be stored finally in an optical disk in the course of manufacturing the disk described below.

With reference also to FIG. 16, after software creation (step 106 therein), if necessary, the software may be edited through a premastering process (as indicated at 150 in FIGS. 16 and 17) to produce a formatted signal that can be recorded on an optical disk. As shown in step 110 of FIG. 16, a laser beam is modulated in accordance with this formatted signal, which is also known as a recording signal, and then applied to the photoresist on the raw disk. In this way, the photoresist experiences an exposure process, recording information conveyed by the recording signal thereon.

Later on, the raw disk is developed, causing pits to appear on the surface of the raw disk. The raw disk processed in this way then typically undergoes an electroforming process 112 to transfer the pits from the glass raw disk to a raw disk made of metal. A metallic stamper is further produced from the metallic raw disk to be used as a mold.

A material such as polymethyl methacrylate (PMMA) or polycarbonate (PC) is then poured into the mold through an injection process 114 and hardened therein. As an alternative, the metallic stamper can be coated with an ultraviolet-ray curable resin such as 2P and then exposed to ultraviolet radiation for hardening it. In this way, the pits are transferred from the metallic stamper to the replica, the resin hardened by the ultraviolet radiation.

Subsequently, a reflective film is created in step 116 on the replica produced in the processes described so far, by deposition, sputtering or the like. As an alternative, a spin-coating process can also be used to create such a reflective film.

In the final processing in a step 118 the raw disk then undergoes a machining process to trim the raw disk to its diameter as well as any other necessary processing, for example, to attach one raw disk to another back-to-back. Further, a label and a hub are affixed thereon. Finally, the raw disk is put in a permanent cartridge to complete the process of producing an optical disk.

With reference again to the encoder 100 of FIG. 15, the inverse-quantization circuit 8 performs inverse-quantization on representative values of the quantized data received from the quantization circuit 6, converting them into inverse-quantized data. That is to say, the quantized data is decoded to produce inverse-quantized data, the form of the data as received by the quantization circuit 6 of the encoder 100 of FIG. 15. The inverse-quantized data is then supplied to an inverse discrete cosine transform (IDCT) circuit 10.

The IDCT circuit 10 performs a conversion process inverse to that carried out by the DCT circuit 5 of the encoder 100 on the decoded data received from the inverse-quantization circuit 8. The inverse-quantized data is converted back by the IDCT circuit 10 into picture data which is then output to a summing circuit 11a. The summing circuit 11a adds a predicted picture, an output from the motion-compensation circuit 11 based on the prediction mode, to the picture data received from the IDCT circuit 10. In this way, the summing circuit 11a can output decoded picture data corresponding with the original picture data. This picture data which is obtained by the local decoding process is supplied to a selector 17 as a picture for subsequent use in generating a forward-predicted picture or a backward-predicted picture.

The selector 17 selects one of three field memory banks constituting a field memory unit 12. It should be noted that data was previously written into the field memory banks. The selector 17 then forwards a new decoded picture supplied thereto to the selected field memory bank. The field memory unit 12 which comprises only three banks stores pictures forwarded thereto one after another.

Based on the prediction mode determined by the prediction judging circuit 3, a selector 18 controls read-out of data from the field memory unit 12 in accordance with a command given by the motion-compensation circuit 11 and outputs the data of a desired decoded picture read out from the field memory unit 12. To be more specific, the selector 18 shifts the read address of the field memory unit 12 by a displacement corresponding to the appropriate motion vector in the forward, backward or bidirectional prediction mode. The selector 18 then reads out data at the shifted read address to be used as a reference in carrying out forward or backward prediction, thus producing a predicted picture. The predicted picture is supplied to the summing circuit 11a and the subtracting circuits 14, 15 and 16 through the selector 18 and the motion-compensation circuit 11. It should be noted that, in the bidirectional-prediction mode, data from both the forward and backward predictions are read out from two field memory banks in accordance with a command given by the motion-compensation circuit 11 and are added in order to compute an average value, in some cases, by the selector 18.

The predicted picture supplied by the motion-compensation circuit 11 is used by the processor 11a to produce a decoded picture and by the subtracting circuits 14, 15 and 16 to compute the difference data described earlier.

A decoder 200 used to implement a decoding technique in accordance with the second to fourth embodiments is shown in FIG. 18. The same reference numerals as those shown in FIG. 7 are used again in FIG. 18 to denote identical components and elements.

A bit stream is supplied to the decoder 200 from a transmission medium. To be more specific, data is reproduced from a transmission medium such as an optical disk by means of a laser beam. The data reproduced from the transmission medium undergoes predetermined demodulation prior to an error-correction process. In addition, if the reproduced data is multiplexed with an audio signal, a synchronization signal and the like, these multiplexed signals are further separated from the reproduced data to produce a bit stream for the picture signal alone. The bit stream is fed to a variable length decoding circuit (IVLC) 22 through a reception buffer 21. The variable-length decoder 22 converts or decodes the quantized data, the motion vector, the prediction mode and the quantization scale conveyed by the bit stream into variable-length codes. The variable-length codes for the quantized data and the quantization scale are supplied to an inverse-quantization circuit 23.

Based on the quantization scale received from the variable-length decoder 22, the inverse-quantization circuit 23 carries out an inverse-quantization process on the quantized data received from the variable-length decoder 22, outputting inverse-quantized data in the form of DCT data. An inverse discrete cosine transformation (IDCT) circuit 24 then performs IDCT processing on the DCT data received from the inverse-quantization circuit 23.

On the other hand, a motion-compensation circuit 25 carries out motion-compensation on a previously decoded picture read out from a field memory unit 26 through a selector 28 in accordance with the decoding mode and the appropriate motion vectors in order to produce a predicted picture to be supplied to a summing circuit 25a. To be more specific, the motion-compensation circuit 25 shifts the read address of the field memory unit 26 from a position of a picture block just output from the IDCT circuit 24 to the summing circuit 25a, by a displacement corresponding to the motion vector received from the variable-length decoder 22, but only if decoding in the forward, backward or bidirectional prediction mode. The motion-compensation circuit 25 then requests the selector 28 to read out data at the shifted read address to be used as a reference in carrying out forward or backward prediction, producing a predicted picture. That is to say, the data read out from the field memory unit 26 is output as predicted-picture data.

In the forward, backward or bidirectional prediction mode, the IDCT circuit 24 provides decoded data representing differences between the actual and predicted pictures. The differences are added by the summing circuit 25a to the predicted picture received from the motion-compensation circuit 25 in a decoding process to produce the actual field picture originally encoded. The decoded data output by the summing circuit 25a is supplied to a selector 27. The selector 27 selects one of three field memory banks constituting a field memory unit 26. It should be noted that data was written previously into the field memory banks. The selector 27 then forwards a new decoded picture supplied thereto to the selected field memory bank. The field memory unit 26 which comprises only three banks stores pictures forwarded thereto one after another.

In the intrafield encoding mode, the picture data itself is output by the IDCT circuit 24. Accordingly, the summing circuit 25a outputs the picture data to the field memory unit 26 to be stored therein as is through the selector 27. Much like the decoded data described above, the picture data output as is by the summing circuit 25a is also stored in the field memory unit 26 for use in the decoding of a subsequent picture encoded in the forward, backward or bidirectional prediction mode.

Based on an encoding mode signal output by the variable-length decoder 22, the selector 28 controls data read-out from the field memory unit 26 in accordance with a command given by the motion-compensation circuit 25 and outputs the data of a desired decoded picture read out from the field memory unit 26 to the summing circuit 25a through the motion-compensation circuit 25. It should be noted that the selector 28 also functions as an adder as well. In the bidirectional-prediction mode, the selector 28 reads out two portions of picture data for both forward and backward predictions from two field memory banks selected in accordance with a command given by the motion-compensation circuit 25, summing them up in order to compute an average value, in some cases.

The predicted picture is substantially the same as corresponding predicted picture used for producing difference data in the encoder. Based on the predicted picture, a picture to be decoded next which may be a P or B-field picture is decoded by forward, backward or bidirectional prediction.

Basically, the operations of the encoder and decoder are the same as the encoding and decoding operations carried out by the first embodiment described hereinabove except that the field memory unit 26 of the present embodiment comprises only three banks and, by switching the field memory unit from one bank to another, prediction can be selectively accomplished in the forward, backward and bidirectional directions. That is why the selectors 17 and 18 of the encoder 100 are provided at the input and output sides of the field memory unit 12 respectively for selecting the correct bank. Likewise, the selectors 27 and 28 are also provided at the input and output sides of the field memory unit 26 respectively for the same purpose.

The above description of the second to fourth embodiments explains application examples in which three field memory banks are used in the bidirectional prediction of a picture from three or four fields. It should be noted, however, that the present invention is also applicable where bidirectional prediction of a picture is carried out from any arbitrarily predetermined field count by using as many or fewer field memory banks as the I and P-fields used to encode.

In addition, the above description of the first to fourth embodiments provide application examples in which a bit stream is recorded in an optical disk. It should be noted, however, that the present invention is also applicable where the bit stream is transmitted by cable, over the air, ISDN, satellite communication or the like.

Furthermore, the above description provides application examples in which the present invention is applied only to apparatus carrying out processing in field units. It should be noted, however, that the present invention can also be applied to an apparatus performing processing in frame units or by switching back and forth between frame and field units provided the apparatus is controlled so that data is read out and written from and into memory during decoding (local decoding) in field units.

If the present invention is applied to encoding and decoding apparatus performing processing in frame units or by switching back and forth between frame and field units, the operation can be managed by using only memory for the processing in field units without the necessity to employ memory for the processing in frame units. Accordingly, the amount of required memory can be reduced. As a result, the cost of the apparatus can also be decreased as well.

In the encoding technique provided by certain embodiments of the present invention, the input, encoding, decoding and output sequences carried out by the encoder and the decoder are modified, allowing the amount of memory employed in the encoder and the decoder to be reduced.

The present invention provides a prediction technique suitable for an interlaced scan data structure and, hence, is applicable to interlaced scan pictures, allowing prediction efficiency to be enhanced and high-quality pictures to be produced.

In addition, according to an aspect of the present invention, the data of two contiguous fields constituting a frame are disposed adjacent or close to each other in a bit stream allowing access to data for a desired frame with a high degree of efficiency and without the need to wastefully decode unnecessary data.

Moreover, according to another aspect of the present invention, two fields forming a frame are encoded one after another or, at least, encoded by processing which is completed in frame units at P-field picture intervals. Accordingly, the present invention provides methods for encoding in field units which may be modified readily to permit frame unit encoding. As a result, switching between a frame unit encoding technique and the field unit encoding method provided by the present invention can be carried out in sets of predetermined fields corresponding with predetermined frame units.

Although specific embodiments of the invention have been described in detail herein with reference to the accompanying drawings, it is to be understood that the invention is not limited to such embodiments, and that various changes and modifications may be effected therein by one skilled in the art without departing from the scope or spirit of the invention as defined in the appended claims.

What is claimed is:

1. A picture signal encoding method for encoding interlaced scan picture signals including a plurality of frames, each frame including first and second fields, comprising the steps of:

encoding a first field of a first frame of the interlaced scan picture signals;

after encoding the first field of the first frame, encoding a second field of the first frame;

after encoding the second field of the first frame, encoding a first field of a second frame of the interlaced scan picture signals utilizing predictions from decoded versions of the encoded first and second fields of the first frame;

after encoding the first field of the second frame, encoding a second field of the second frame utilizing predictions from only decoded versions of the encoded second field of the first frame and the encoded first field of the second frame;

encoding a first field of a third frame of the interlaced scan picture signals timewise between the first and second frames utilizing predictions from decoded versions of the encoded first and second fields of the first frame and the encoded first and second fields of the second frame; and encoding a second field of the third frame utilizing predictions from decoded versions of the encoded first and second fields of the first frame and the encoded first and second fields of the second frame.

2. The method of claim 1, wherein the second field of the first frame is encoded utilizing predictions from a decoded version of the encoded first field of the first frame.

3. The method of claim 2, wherein the first field of the first frame is encoded by intrafield encoding and without carrying out interfield encoding, and the second field of the first frame is encoded utilizing predictions from only a decoded version of the encoded first field of the first frame.

4. The method of claim 3, wherein the second field of the first frame is encoded in part by intrafield encoding.

5. The method of claim 2, wherein the first and second fields of the first frame are each encoded by selecting at least one encoding technique from a predetermined encoding technique set including an intrafield encoding technique and an interfield encoding technique utilizing predictions from single fields, while avoiding encoding thereof through bidirectionally predictive encoding.

6. The method of claim 1, wherein the interlaced scan picture signals represent corresponding images in a predetermined time sequence, and wherein the first field of the first frame precedes the second field of the first frame in the predetermined time sequence, the second field of the first frame precedes the first field of the second frame in the predetermined time sequence, and the first field of the second frame precedes the second field of the second frame in the predetermined time sequence.

7. The method of claim 1, wherein the interlaced scan picture signals represent corresponding images in a predetermined time sequence, and wherein the second field of the first frame precedes the first field of the first frame in the predetermined time sequence, the first field of the first frame precedes the second field of the second frame in the predetermined time sequence, and the second field of the second frame precedes the first field of the second frame in the predetermined time sequence.

8. A picture signal encoder for encoding interlaced scan picture signals including a plurality of frames, each frame including first and second fields, comprising:

first means for encoding a first field of a first frame of the interlaced scan picture signals;

second means for encoding a second field of the first frame after the first field of the first frame has been encoded;

third means for encoding a first field of a second frame of the interlaced scan picture signals after the second field of the first frame has been encoded, the first field of the second frame being encoded utilizing predictions from decoded versions of the encoded first and second fields of the first frame;

fourth means for encoding a second field of the second frame after the first field of the second frame has been encoded, the second field of the second frame being encoded utilizing predictions from only decoded versions of the encoded second field of the first frame and the encoded first field of the second frame;

fifth means for encoding a first field of a third frame of the interlaced scan picture signals timewise between the first and second frames utilizing predictions from decoded versions of the encoded first and second fields of the first frame and the encoded first and second fields of the second frame; and sixth means for encoding a second field of the third frame utilizing predictions from decoded versions of the encoded first and second fields of the first frame and the encoded first and second fields of the second frame.

9. The encoder of claim 8, wherein the second means is operative to encode the second field of the first frame utilizing predictions from a decoded version of the encoded first field of the first frame.

10. The encoder of claim 9, wherein the first means is operative to encode the first field of the first frame by intrafield encoding and without carrying out interfield encoding, and the second means is operative to encode the second field of the first frame utilizing predictions from only a decoded version of the encoded first field of the first frame.

11. The encoder of claim 10, wherein the second means is operative to encode the second field of the first frame in part by intrafield encoding.

12. The encoder of claim 9, wherein the first and second means are operative to encode the first and second fields of the first frame, respectively, by selecting at least one encoding technique from a predetermined encoding technique set including an intrafield encoding technique and an interfield encoding technique utilizing predictions from single fields while avoiding encoding thereof through bidirectionally predictive encoding.

13. The encoder of claim 8, wherein the interlaced scan picture signals represent corresponding images in a predetermined time sequence, and wherein the first field of the first frame precedes the second field of the first frame in the predetermined time sequence, the second field of the first frame precedes the first field of the second frame in the predetermined time sequence, and the first field of the second frame precedes the second field of the second frame in the predetermined time sequence.

14. The encoder of claim 8, wherein the interlaced scan picture signals represent corresponding images in a predetermined time sequence, and wherein the second field of the first frame precedes the first field of the first frame in the predetermined time sequence, the first field of the first frame precedes the second field of the second frame in the predetermined time sequence and the second field of the second frame precedes the first field of the second frame in the predetermined time sequence.

15. A device-readable record storing interlaced scan picture signals including a plurality of frames, each frame including first and second fields, comprising:

a record medium;

a first field of a first frame of the interlaced scan picture signals stored on the record medium in encoded form produced by a predetermined encoder;

a second field of the first frame stored on the record medium in encoded form produced by the predetermined encoder after producing the encoded form of the first field of the first frame;

a first field of a second frame of the interlaced scan picture signals stored on the record medium in encoded form produced by the predetermined encoder after producing the encoded form of the second field of the first frame and utilizing predictions from decoded versions of the encoded first and second fields of the first frame;

a second field of the second frame stored on the record medium in encoded form produced by the predetermined encoder after producing the encoded form of the first field of the second frame and utilizing predictions from only decoded versions of the encoded second field of the first frame and the encoded first field of the second frame;

a first field of a third frame of the interlaced scan picture signals timewise between the first and second frames, stored on the record medium in encoded form produced by the predetermined encoder utilizing predictions from decoded versions of the encoded first and second fields of the first frame and the encoded first and second fields of the second frame; and a second field of the third frame stored on the record medium in encoded form produced by the predetermined encoder utilizing predictions from decoded versions of the encoded first and second fields of the first frame and the encoded first and second fields of the second frame.

16. The device-readable record of claim 15, wherein the second field of the first frame is encoded by the predetermined encoder utilizing predictions from a decoded version of the encoded first field of the first frame.

17. The device-readable record of claim 16, wherein the first field of the first frame is encoded by the predetermined encoder by intrafield encoding and without carrying out interfield encoding, and the second field of the first frame is encoded by the predetermined encoder utilizing predictions from only a decoded version of the encoded first field of the first frame.

18. The device-readable record of claim 17, wherein the second field of the first frame is encoded by the predetermined encoder in part by intrafield encoding.

19. The device-readable record of claim 16, wherein the first and second fields of the first frame are each encoded by the predetermined encoder by selecting at least one encoding technique from a predetermined encoding technique set including an intrafield encoding technique and an interfield encoding technique utilizing predictions from single fields, while avoiding encoding thereof through bidirectionally predictive encoding.

20. The device-readable record of claim 15, wherein the interlaced scan picture signals represent corresponding images in a predetermined time sequence, and wherein the first field of the first frame precedes the second field of the first frame in the predetermined time sequence, the second field of the first frame precedes the first field of the second frame in the predetermined time sequence, and the first field of the second frame precedes the second field of the second frame in the predetermined time sequence.

21. The device-readable record of claim 15, wherein the interlaced scan picture signals represent corresponding images in a predetermined time sequence, and wherein the second field of the first frame precedes the first field of the first frame in the predetermined time sequence, the first field of the first frame precedes the second field of the second frame in the predetermined time sequence, and the second field of the second frame precedes the first field of the second frame in the predetermined time sequence.

22. A picture-signal decoding method for decoding interlaced scan picture signals including a plurality of frames, each frame including first and second fields, the interlaced scan signals including encoded first and second fields of a first frame wherein the second field has been encoded after the first field, an encoded first field of a second frame encoded after the second field of the first frame utilizing predictions from decoded versions of the encoded first and second fields of the first frame, an encoded second field of the second frame encoded after the first field of the second frame utilizing predictions from decoded versions of the encoded second field of the first frame and the encoded first field of the second frame, and encoded first and second fields of a third frame timewise between the first and second frames each encoded utilizing predictions from decoded versions of the encoded first and second fields of the first frame and the encoded first and second fields of the second frame, comprising the steps of:

decoding the first field of the first frame;

after decoding the first field of the first frame, decoding the second field of the first frame;

after decoding the second field of the first frame, decoding the first field of the second frame utilizing predictions from the decoded first and second fields of the first frame;

after decoding the first field of the second frame, decoding the second field of the second frame utilizing predictions from only the decoded second field of the first frame and the decoded first field of the second frame; and decoding the first and second fields of the third frame utilizing predictions from the decoded first and second fields of the first frame and the decoded first and second fields of the second frame.

23. The method of claim 22, wherein the step of decoding the second field of the first frame comprises utilizing a prediction from the decoded first field of the first frame, the first field of the first frame having been encoded by at least one of intrafield encoding and interfield encoding utilizing predictions only from a decoded version of a single encoded field of the interlaced scan signals.

24. The method of claim 23, wherein the first field of the first frame is decoded by intrafield decoding and without carrying out interfield decoding.

25. The method of claim 22, wherein the first and second fields of the first frame are decoded during first respective field decoding intervals arranged one after the other within a predetermined sequence of field decoding intervals without the occurrence of any field decoding interval between the first respective field decoding intervals, and wherein the first and second fields of the second frame are decoded during second respective field decoding intervals arranged one after the other within the predetermined sequence of field decoding intervals without the occurrence of any field decoding interval between the second respective field decoding intervals.

26. The method of claim 25, wherein the first and second fields of the third frame are decoded during third respective field decoding intervals arranged one after the other within the predetermined sequence of field decoding intervals without the occurrence of any field decoding interval between the third respective field decoding intervals.

27. The method of claim 22, further comprising arranging the decoded first and second fields of the first and second frames in an output field time sequence such that the decoded first field of the first frame precedes the decoded second field thereof in the output field time sequence, the decoded second field of the first frame precedes the decoded first field of the second frame in the output field time sequence and the decoded first field of the second frame precedes the decoded second field of the second frame in the output field time sequence.

28. The method of claim 22, further comprising arranging the decoded first and second fields of the first and second frames in an output field time sequence such that the decoded second field of the first frame precedes the decoded first field of the first frame in the output field time sequence, the decoded first field of the first frame precedes the decoded second field of the second frame in the output field time sequence, and the decoded second field of the second frame precedes the decoded first field of the second frame in the output field time sequence.

29. A picture-signal decoding apparatus for decoding interlaced scan picture-signals including a plurality of frames, each frame including first and second fields, the interlaced scan picture-signals including encoded first and second fields of a first frame wherein the second field has been encoded after the first field, an encoded first field of a second frame encoded after the second field of the first frame utilizing predictions from decoded versions of the encoded first and second fields of the first frame, an encoded second field of the second frame encoded after the first field of the second frame utilizing predictions from decoded versions of the encoded second field of the first frame and the encoded first field of the second frame, and encoded first and second fields of a third frame timewise between the first and second frames each encoded utilizing predictions from decoded versions of the encoded first and second fields of the first frame and the encoded first and second fields of the second frame, comprising:

first means for decoding the first field of the first frame;

second means for decoding the second field of the first frame after the first field of the first frame has been decoded;

third means for decoding the first field of the second frame after the second field of the first frame has been decoded, the third means serving to decode the first field of the second frame utilizing predictions from the decoded first and second fields of the first frame;

fifth means for decoding the second field of the second frame after the first field of the second frame has been decoded, the fifth means serving to decode the second field of the second frame utilizing predictions from only the decoded second field of the first frame and the decoded first field of the second frame; and sixth means for decoding the first and second fields of the third frame utilizing predictions from the decoded first and second fields of the first frame and the decoded first and second fields of the second frame.

30. The apparatus of claim 29, wherein the second means serves to decode the second field of the first frame utilizing a prediction from the decoded first field of the first frame, the first field of the first frame having been encoded by at least one of intrafield encoding and interfield encoding utilizing predictions only from a decoded version of a single encoded field of the interlaced scan signals.

31. The apparatus of claim 30, wherein the first means serves to decode the first field of the first frame by intrafield decoding and without carrying out interfield decoding.

32. The apparatus of claim 29, wherein the first and second means are operative to decode the first and second fields of the first frame, respectively, during first respective field decoding intervals arranged one after the other within a predetermined sequence of field decoding intervals without the occurrence of any field decoding interval between the first respective field decoding intervals, and wherein the third and fourth means serve to decode the first and second fields of the second frame during second respective field decoding intervals arranged one after the other within the predetermined sequence of field decoding intervals without the occurrence of any field decoding interval between the second respective field decoding intervals.

33. The apparatus of claim 29, further comprising means for arranging the decoded first and second fields of the first and second frames in an output field time sequence such that the decoded first field of the first frame precedes the decoded second field thereof in the output field time sequence, the decoded second field of the first frame precedes the decoded first field of the second frame in the output field time sequence and the decoded first field of the second frame precedes the decoded second field of the second frame in the output field time sequence.

34. The apparatus of claim 29, further comprising means for arranging the decoded first and second fields of the first and second frames in an output field time sequence such that the decoded second field of the first frame precedes the decoded first field of the second frame in the output field time sequence, the decoded first field of the first frame precedes the decoded second field of the second frame in the output field time sequence, and the decoded second field of the second frame precedes the decoded first field of the second frame in the output field time sequence.

* * * * *